(12) United States Patent
Ono et al.

(10) Patent No.: US 7,684,883 B2
(45) Date of Patent: Mar. 23, 2010

(54) INFORMATION PROCESSING APPARATUS, INFORMATION PROCESSING METHOD, AND PROGRAM

(75) Inventors: Hideyuki Ono, Kanagawa (JP); Osamu Shimoyoshi, Kanagawa (JP); Kiyoshi Aida, Kanagawa (JP); Yoshinori Utsumi, Tokyo (JP); Toshio Ohkouchi, Tokyo (JP); Toshihiro Morita, Kanagawa (JP); Rie Usukura, Saitama (JP)

(73) Assignee: Sony Corporation, Tokyo (JP)

( * ) Notice: Subject to any disclaimer, the term of this patent is extended or adjusted under 35 U.S.C. 154(b) by 1386 days.

(21) Appl. No.: 11/099,491

(22) Filed: Apr. 6, 2005

(65) Prior Publication Data

US 2005/0246163 A1 Nov. 3, 2005

(30) Foreign Application Priority Data

Apr. 28, 2004 (JP) .............................. 2004-134187

(51) Int. Cl.
*G06F 17/00* (2006.01)
(52) U.S. Cl. ........................................................ 700/94
(58) Field of Classification Search ................... 700/94; 381/56, 63
See application file for complete search history.

(56) References Cited

U.S. PATENT DOCUMENTS

| | | | | |
|---|---|---|---|---|
| 5,802,186 | A * | 9/1998 | Kubota | 381/107 |
| 6,069,311 | A * | 5/2000 | Hiramatsu | 84/659 |
| 6,148,243 | A * | 11/2000 | Ishii et al. | 700/94 |
| 7,039,478 | B2 * | 5/2006 | Ledoux et al. | 700/94 |
| 7,512,453 | B2 * | 3/2009 | Wu et al. | 700/94 |

FOREIGN PATENT DOCUMENTS

| | | |
|---|---|---|
| JP | 1-276912 | 11/1989 |
| JP | 7-87334 | 9/1995 |
| JP | 7-254842 | 10/1995 |
| JP | 7-101834 | 11/1995 |
| JP | 7-307629 | 11/1995 |
| JP | 9-258736 | 10/1997 |
| JP | 11-175059 | 7/1999 |
| JP | 11-259285 | 9/1999 |
| JP | 2000-81883 | 3/2000 |
| JP | 2002-73039 | 3/2002 |
| JP | 2002-73439 | 3/2002 |
| JP | 2003-271406 | 9/2003 |
| JP | 2004-219604 | 8/2004 |
| JP | 2005-317115 | 11/2005 |

* cited by examiner

*Primary Examiner*—Andrew C Flanders
(74) *Attorney, Agent, or Firm*—Oblon, Spivak, McClelland, Maier & Neustadt, L.L.P.

(57) ABSTRACT

An information processing method is disclosed for use with an information processing apparatus for acquiring data and executing signal processing on the data. The method includes the steps of: acquiring information necessary for executing the signal processing on the data; determining whether a certain parameter included in the information acquired in the information acquiring step is changed; if the parameter is found changed in the determining step, then controlling recording of setting information for the signal processing; discarding execution status settings of a signal processing program called up to execute the signal processing; calling up again the signal processing program; initializing, using the changed parameter, the signal processing program called up in the program calling step; reading out the setting information of which the recording was controlled in the setting information recording controlling step; and resetting the signal processing program based on the setting information read out in the setting information reading step.

7 Claims, 21 Drawing Sheets

INFORMATION PROCESSING APPARATUS, INFORMATION PROCESSING METHOD, AND PROGRAM

CROSS REFERENCE TO RELATED APPLICATION

The present invention contains subject matter related to Japanese Patent Application JP 2004-134187 filed in the Japanese Patent Office on Apr. 28, 2004, the entire contents of which being incorporated herein by reference.

BACKGROUND OF THE INVENTION

The present invention relates to an information processing apparatus, an information processing method, and a program. More particularly, the invention relates to an information processing apparatus, an information processing method, and a program for applying effects to the information to be output.

The widespread use of personal computers in recent years has prompted large numbers of people to reproduce music using their PCs. Typically, users utilize an application program capable of audio reproduction to reproduce and enjoy audio data recorded on a recording medium loaded in the personal computer as well as audio data stored inside the personal computer.

Where Windows (registered trademark) is used as the operating system (OS) of the personal computer, the standard audio output functions of the OS are offered by DLL (Dynamic Link Library) called Winmm.dll in the windows¥system32 folder. Illustratively, when sound effects are reproduced during execution of an application program such as a video game, the application program supplies audio data reproduction commands to Winmm.dll. In turn, Winmm.dll transfers the audio data reproduction commands along with audio data to a user mode driver corresponding to the audio device to be set for each application program. A typical standard user mode driver of Windows (R) is Wdmaud.drv.

Referring to FIG. 1, steps to reproduce audio data using Windows (registered trademark) as the OS are explained below. In step S1, a typical application program for audio reproduction calls up the waveoutOpen function of Winmm.dll at the time when an audio data reproduction process takes place. The waveoutOpen function is a function that opens an output device.

In step S2, Winmm.dll calls up the wodMessageOpen function of Wdmaud.drv designated as the user mode driver, in order to open the driver and set parameters necessary for the transfer and reproduction of audio data.

After the open sequence, the application program in step S3 generally calls up the waveoutWrite function of Winmm.dll. In step S4, Winmm.dll calls up the wodMessageWrite function of Wdmaud.drv so as to transfer the audio data. Steps S3 and S4 are repeated until writing of the audio data is finished.

After the audio data has been written, the application program in step S5 generally calls up the waveoutClose function of Winmm.dll. In step S6, Winmm.dll calls up the wodMessageClose function of Wdmaud.drv to terminate the audio data reproduction process.

Techniques exist for reproducing source audio data not only as it is but also with various sound effects added during reproduction. With such techniques, it is possible illustratively to emphasize specific frequency bands of the source audio data for particular effects. For example, lacking sound portions may be compensated to clarify what may be called sound contours; the bass register may be compensated to make reproduced music sound more powerful; the alto and treble registers may be compensated to make the music sound more brilliant; or reverberating effects may be added so as to make the music sound as if it were being played in a theater or in a small-scale live-performance establishment. The techniques are disclosed illustratively in a document "Virtual 3D Surround Software QMAX II" disclosed online by Easy Systems Japan at http://www.easy.co.jp/qmax2/index.html (retrieved on the Internet on Mar. 22, 2004).

The above-described typical application program has UI (user interface) for operating effect parameters. Based on the user's operation input, the application program can apply sound effects to the audio data being reproduced by another application program. The typical application program discussed above will be referred to as an effect parameter operating application program in the ensuing description.

It might happen that audio data being reproduced by a typical application program is subject to sound effects provided by the effect parameter operating application program which is stopped halfway while the data reproducing program is still in operation. In such a case, with the effect parameter operating application program deactivated, the audio data reproduced by the typical application program is still being output together with the sound effects. That is, the effect parameter operating application program controls audio processing parameters for an audio data processing module, and does not operate on the audio data directly.

Illustratively, as shown in FIG. 2, the audio data reproduced by a typical application program 1 is supplied to an audio data hook/signal processing module 2 capable of hooking audio data and processing signals. Given parameter settings from an effect parameter operating application program 3, the audio data hook/signal processing module 2 gives sound effects to the supplied audio data. The audio data thus processed is fed to a driver 4 that controls the operation of hardware such as speakers for audio output.

As outlined above, there already exist application programs capable of applying sound effects to audio data being reproduced. However, the types of effects are specific to each application program; it has been difficult for such application programs to utilize standard effect plug-ins such as DirectX Plug-in and VST.

One way to use such standard plug-ins is to constitute a user mode driver that is visible to an audio driver. The user mode driver may hook audio data and give sound effects to the hooked data using the plug-ins. In such cases, diverse application programs reproduce audio data at diverse sampling frequencies, so that the standard plug-ins receive signal processing requests at these diverse sampling frequencies. Meanwhile, many plug-ins have been developed for use with audio data editing applications. It follows that if a sampling frequency is changed halfway through reproduction, the GUI in use may become inconsistent with the changed sampling frequency or the change may lead to other errors.

SUMMARY OF THE INVENTION

The present invention has been made in view of the above circumstances and provides arrangements for letting signal processing proceed without error even if some of the parameters for signal processing are changed halfway through the processing so that, illustratively, when existing effect plug-ins prepared for use with editing applications are used to give sound effects to audio data being reproduced, it is possible to avert problems even if some of the plug-ins are prone to such difficulties upon change of the sampling frequency halfway through the processing.

According to an embodiment of the present invention, there is provided an information processing apparatus for acquiring data and executing signal processing on the data, the information processing apparatus including: a data acquiring device for acquiring the data; an information acquiring device for acquiring information necessary for executing the signal processing on the data; a signal processing device for executing the signal processing on the data acquired by the data acquiring device; a signal processing controlling device for controlling the signal processing device based on the information acquired by the information acquiring device; and a setting information recording controlling device for controlling recording of setting information for the signal processing device; wherein the signal processing device executes the signal processing on the data by calling up at least one signal processing program; wherein, if a certain parameter included in the information acquired by the information acquiring device is changed, then the setting information recording controlling device controls the recording of the setting information for the signal processing device; wherein, after discarding execution status settings of the signal processing program called up by the signal processing device, the signal processing controlling device again calls up the signal processing program for initialization using the changed parameter, reads out the setting information of which the recording was controlled by the setting information recording controlling device, and resets the setting information for the signal processing program called up by the signal processing device.

Preferably, the above embodiment may include a data controlling device which, when the data is acquired, determines whether the signal processing is to be executed by the signal processing device on the data so as to control an output destination for the data; and a recording device for temporarily recording the data and the information so that the signal processing device and the data controlling device may exchange either the data or the information therebetween; wherein the data controlling device, upon determining that the signal processing is to be executed, may record the data and the information to the recording device; and wherein the data acquiring device and the information acquiring device may acquire the data and the information recorded by the recording device.

At least one of the signal processing programs to be called up by the signal processing device may preferably be constituted by an effect plug-in.

Preferably, the effect plug-in may apply predetermined effects to audio data; and the parameter may be a sampling frequency.

According to another embodiment of the present invention, there is provided an information processing method for use with an information processing apparatus for acquiring data and executing signal processing on the data, the information processing method including the steps of: acquiring information necessary for executing the signal processing on the data; determining whether a certain parameter included in the information acquired in the information acquiring step is changed; if the parameter is found changed in the determining step, then controlling recording of setting information for the signal processing; discarding execution status settings of a signal processing program called up to execute the signal processing; calling up again the signal processing program; initializing, using the changed parameter, the signal processing program called up in the program calling step; reading out the setting information of which the recording was controlled in the setting information recording controlling step; and resetting the signal processing program based on the setting information read out in the setting information reading step.

According to a further embodiment of the present invention, there is provided a program for causing a computer to execute signal processing on data, the program including the steps of: acquiring information necessary for executing the signal processing on the data; determining whether a certain parameter included in the information acquired in the information acquiring step is changed; if the parameter is found changed in the determining step, then controlling recording of setting information for the signal processing; discarding execution status settings of a signal processing program called up to execute the signal processing; calling up again the signal processing program; initializing, using the changed parameter, the signal processing program called up in the program calling step; reading out the setting information of which the recording was controlled in the setting information recording controlling step; and resetting the signal processing program based on the setting information read out in the setting information reading step.

Where the information processing apparatus, information processing method, and program embodying the present invention are in use, information necessary for executing signal processing on data is first acquired. A check is made to determine whether a certain parameter in the acquired information is changed. If the parameter is found changed, setting information for the signal processing is recorded, and execution status settings of a signal processing program called up to execute the signal processing are discarded. The signal processing program is again called up and initialized using the changed parameter. The recorded setting information is read out, and the signal processing program is reset based on the setting information thus read out.

According to the above-outlined embodiments of the invention, data can be output after being subjected to signal processing. In particular, after some of the parameters for the signal processing has been changed, the settings of the signal processing are temporarily stored. After that, execution status settings of the signal processing program called up to execute the signal processing are discarded. The signal processing program is again called up and initialized using the changed parameter. Then the temporarily stored settings are read out and the signal processing program is reset accordingly, whereby the signal processing is allowed to proceed without error.

Other objects, features and advantages of the present invention will become more apparent in the following specification and accompanying drawings.

BRIEF DESCRIPTION OF THE DRAWINGS

FIG. 9 is an explanatory view of a detailed setting screen displayed in order to provide detailed settings for an effect plug-in;

DESCRIPTION OF THE PREFERRED EMBODIMENTS

What is described below as the preferred embodiments of this invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of this invention but which may be added or brought about by this applicant in the future by divisional application or by amendment.

Figure 5:
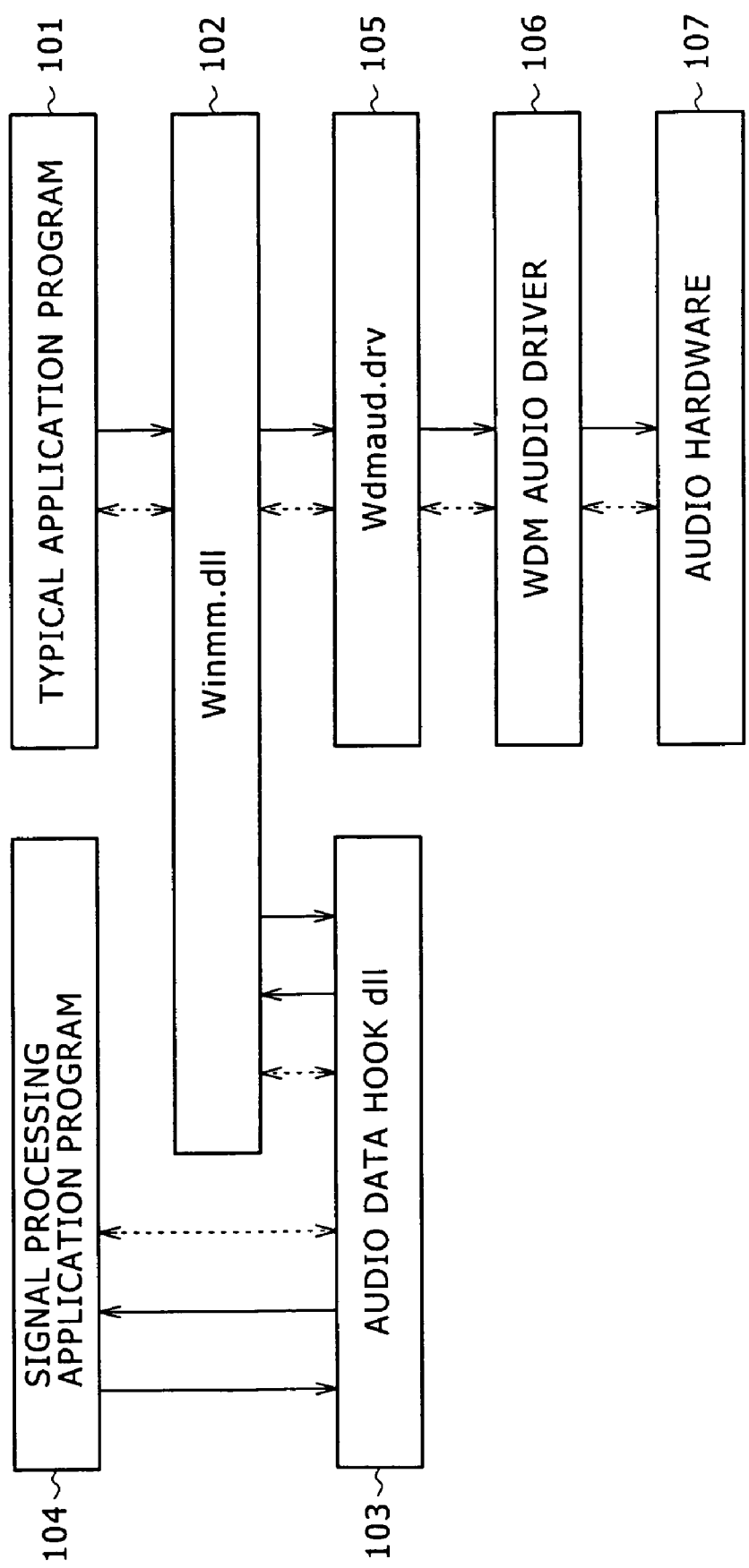
FIG. 5 is a schematic view showing relations between software and hardware modules in effect when an embodiment of the present invention is practiced.
Figure 6:
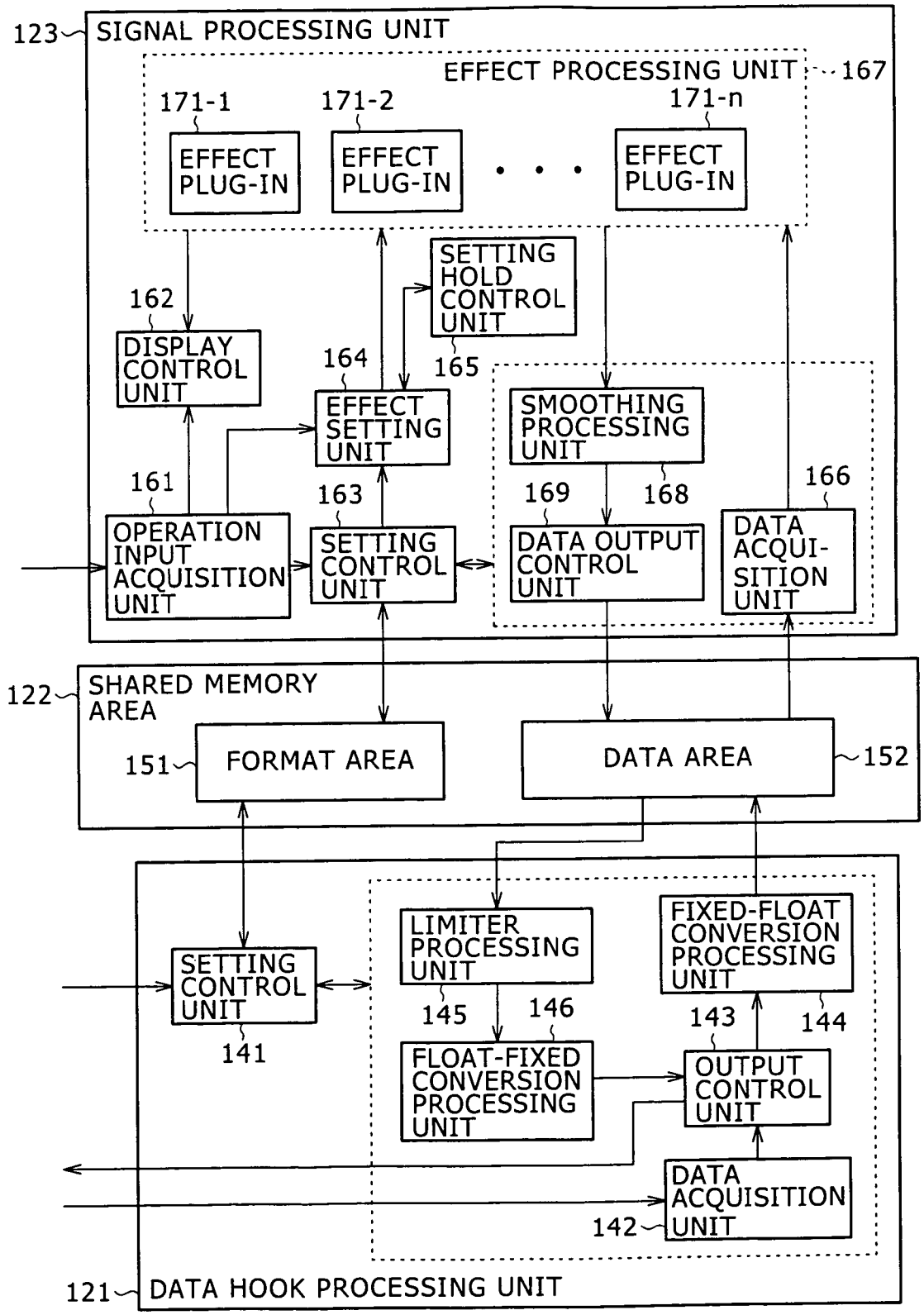
FIG. 6 is a function block diagram outlining functions that may be implemented by an audio data hook dynamic data library (dll) in FIG. 5 and a signal processing application program being carried out.

One preferred embodiment of this invention is an information processing apparatus (e.g., a personal computer 21 having a signal processing unit 123 in FIG. 6 implemented as a signal processing application program 104 in FIG. 5) for acquiring data (e.g., audio data reproduced by a typical application program 101) and executing signal processing on the data. The information processing apparatus includes: a data acquiring device (e.g., data acquisition unit 166 in FIG. 6) for acquiring the data; an information acquiring device (e.g., setting control unit 163 in FIG. 6) for acquiring information necessary for executing the signal processing on the data; a signal processing device (e.g., effect processing unit 167 in FIG. 6) for executing the signal processing on the data acquired by the data acquiring device; a signal processing controlling device (e.g., effect setting unit 164 in FIG. 6) for controlling the signal processing device based on the information acquired by the information acquiring device; and a setting information recording controlling device (e.g., setting hold control unit 165 in FIG. 6) for controlling recording of setting information for the signal processing device. The signal processing device executes the signal processing on the data by calling up at least one signal processing program (e.g., any one of effect plug-ins 171-1 through 171-n in FIG. 6). If a certain parameter (e.g., sampling frequency) included in the information acquired by the information acquiring device is changed, then the setting information recording controlling device controls the recording of the setting information for the signal processing device. After discarding execution status settings of the signal processing program called up by the signal processing device, the signal processing controlling device again calls up the signal processing program for initialization using the changed parameter, reads out the setting information of which the recording was controlled by the setting information recording controlling device, and resets the setting information for the signal processing program called up by the signal processing device.

Preferably, the above-outlined embodiment may include a data controlling device (e.g., audio data hook dll 103 in FIG. 5 implemented as a data hook processing unit 121 in FIG. 6) which, when the data is acquired, determines whether the signal processing is to be executed by the signal processing device on the data so as to control an output destination for the data; and a recording device (e.g., shared memory area 122 in FIG. 6) for temporarily recording the data and the information so that the signal processing device and the data controlling device may exchange either the data or the information therebetween. The data controlling device, upon determining that the signal processing is to be executed, may record the data and the information to the recording device. The data acquiring device and the information acquiring device may acquire the data and the information recorded by the recording device.

Another preferred embodiment of this invention is an information processing method for use with an information processing apparatus (e.g., a personal computer 21 having a signal processing unit 123 in FIG. 6 implemented as a signal processing application program 104 in FIG. 5) for acquiring data (e.g., audio data reproduced by a typical application program 101) and executing signal processing on the data. The information processing method includes the steps of: acquiring information necessary for executing the signal processing on the data (e.g., in step S113 of FIG. 14); determining whether a certain parameter (e.g., sampling frequency) included in the information acquired in the information acquiring step is changed (in step S114 of FIG. 14); if the parameter is found changed in the determining step, then controlling recording of setting information for the signal processing (e.g., in step S131 of FIG. 15); discarding execution status settings of a signal processing program called up to execute the signal processing (e.g., in step S132 of FIG. 15); calling up again the signal processing program (e.g., in step S133 of FIG. 15, for reconstructing the program, i.e., again allocating an effect plug-in processing area in a RAM 36 so as to reference the area for processing execution); initializing, using the changed parameter, the signal processing program called up in the program calling step (e.g., in step S134 of FIG. 15); reading out the setting information of which the recording was controlled in the setting information recording controlling step (e.g., in step S135 of FIG. 15); and resetting the signal processing program based on the setting information read out in the setting information reading step (e.g., in step S136 of FIG. 15).

A further preferred embodiment of this invention is a program that has the same steps as those included in the inventive information processing method outlined above.

The preferred embodiments will now be described in more detail with reference to the accompanying drawings.

Figure 3:
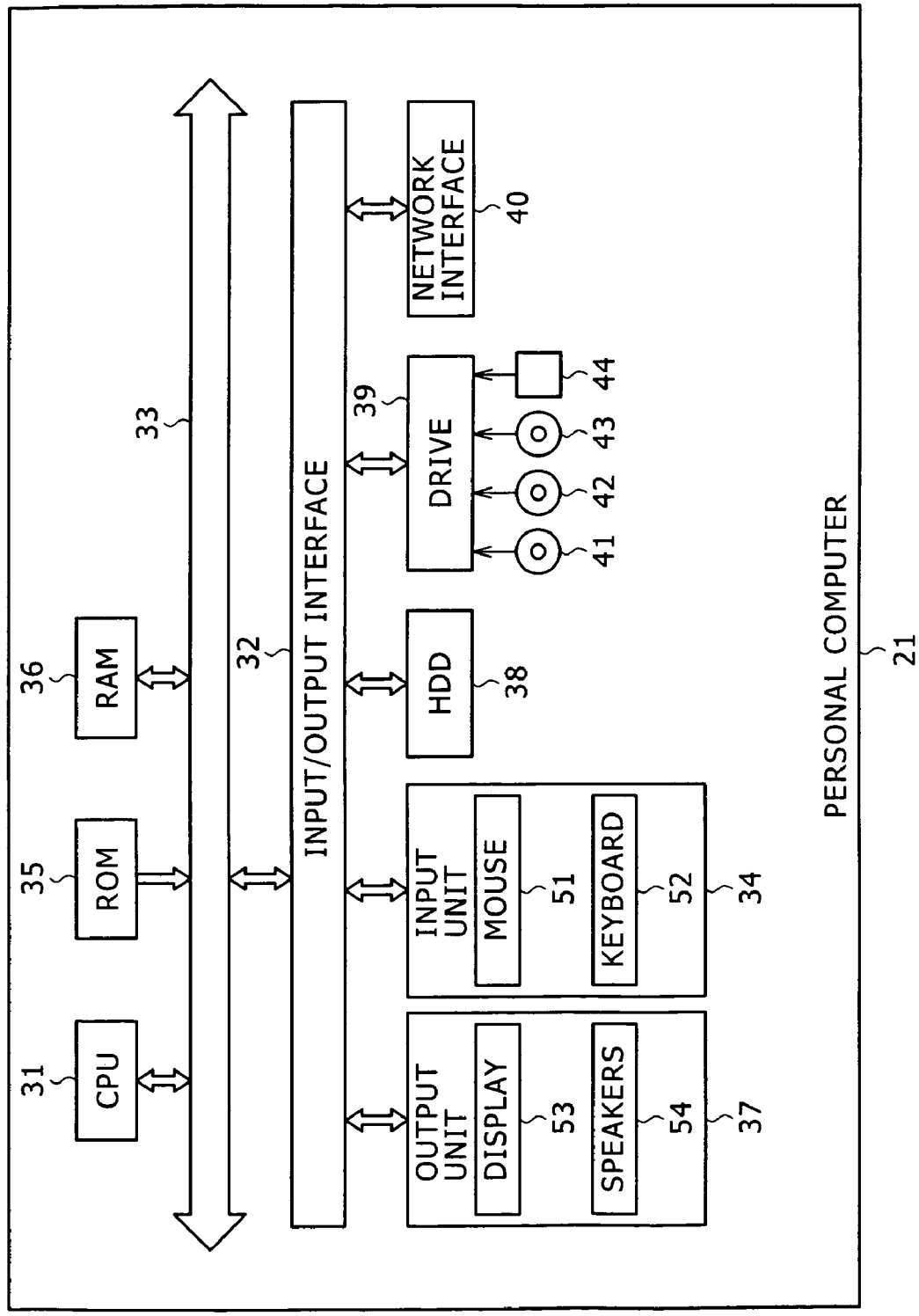
FIG. 3 is a block diagram showing a structure of a personal computer to which an embodiment of the present invention is applied.

FIG. 3 is a block diagram showing a hardware structure of a personal computer 21 to which an embodiment of the present invention is applied. A CPU 31 in the personal computer 21 provides overall control on PC operations. When a user's operation input is entered from an input unit 34 made up of a mouse 51 and a keyboard 52 via an internal bus 33 and an input/output interface 32, the CPU 31 loads a corresponding program from a ROM (read only memory) 35 into a RAM (random access memory) 36 for program execution. Alternatively, the CPU 31 loads relevant programs from an HDD 38 into the RAM 36 for execution and causes an output unit 37 formed by a display device 53 and speakers 54 to output results of the execution. Furthermore, the CPU 31 communicates with the outside through a network interface 40 in order to exchange data with external entities.

The CPU 31 is connected as needed to a drive 39 via the internal bus 33 and input/output interface 32. Thus connected, the CPU 31 may write and read data to and from a magnetic disk 41, an optical disk 42, a magneto-optical disk 43, or a semiconductor memory 44 placed as needed into the drive 39.

Figure 4:
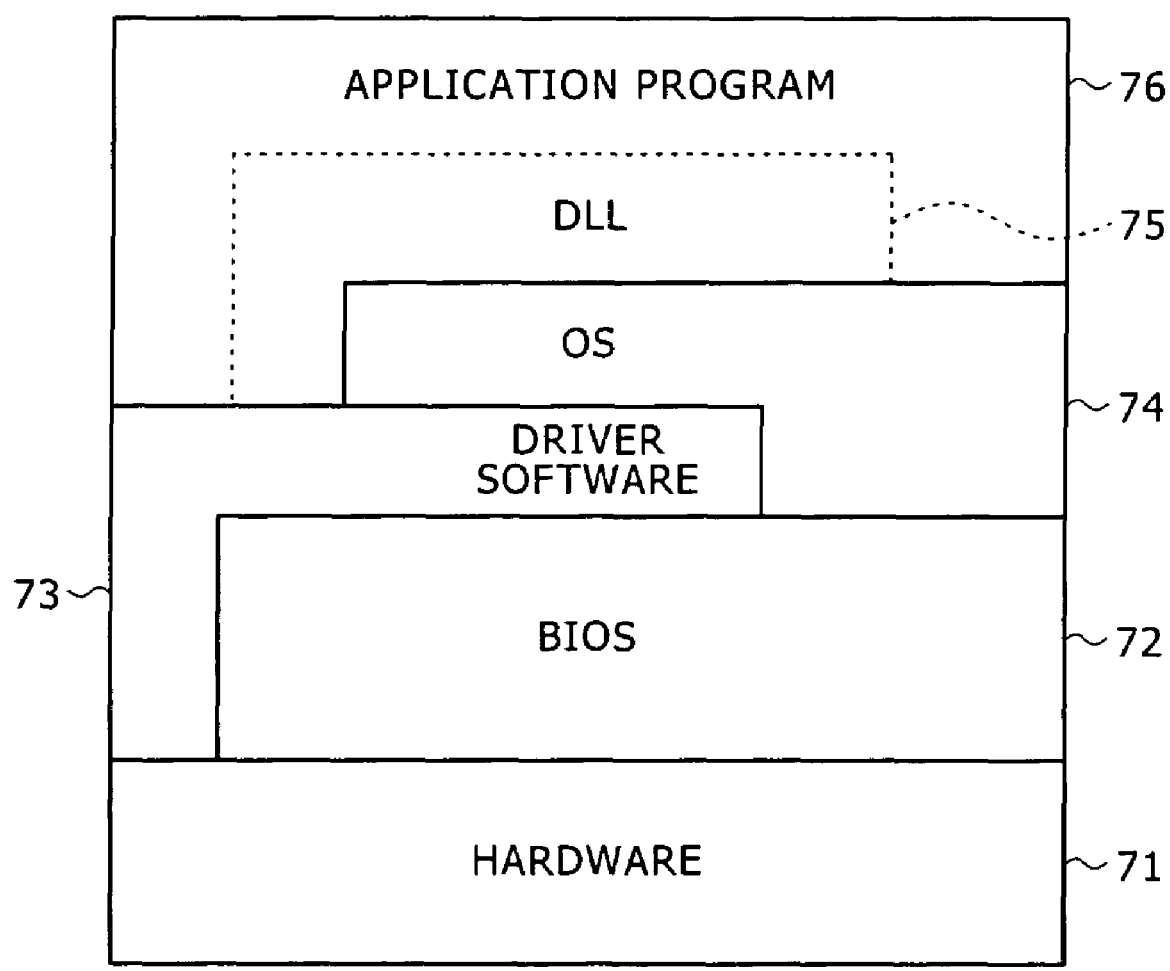
FIG. 4 is a schematic view showing relations between hardware and a stack of software executable by a CPU.

FIG. 4 is a schematic view showing relations between a stack of software executable by the CPU 31 on the one hand, and hardware 71 for operating the mouse 51 and keyboard 52 of the input unit 34, the display device 53 and speakers 54 of the output unit 37, and the HDD 38 on the other hand.

More specifically, the hardware 71 refers to a video board, a sound board, a network board, etc., for operating the mouse 51 and keyboard 52 of the input unit 34, the display device 53 and speakers 54 of the output unit 37, the HDD 38, and the like.

A BIOS (basic I/O system) 72 is designed to let an OS 74 and application programs 76 gain access to devices of the personal computer 21. The BIOS is also called firmware that is distinct from software.

Driver software 73 is dedicated to operating the hardware 71. The driver software 73 illustratively includes a mouse driver for operating the mouse 51, a display driver for operating the video card that causes the display device to display images, and a printer driver for operating a printer (not shown) connected through the network interface 40.

The OS 74 controls basic operations of the personal computer 21 and manages its various resources. For example, instructions generated by an application program 76 are forwarded by the OS 74 to the driver software 73 and BIOS 72. When furnished with multitask and multi-window functions, the OS 74 manages executable contexts of the application software 76 (i.e., register sets, main memory images, file handles, etc., used by a given application program 76) and software resources such as GUI parts. Illustratively, the OS 74 may be Windows 95 (registered trademark), Windows 98 (registered trademark), Windows NT (registered trademark), Linux, OS/2 (registered trademark), or some other suitable platform. In the description that follows, the OS 74 is assumed to be one of the Windows (R) platforms.

A DLL (dynamic link library)) 75 is an independent shared-use file that collects functions in library form necessary for software execution. Usually, the file itself is called DLL. Whereas subroutines usually exist inside programs, the DLL 75 is distinct from the programs in that it is loaded at the time of execution. Windows (R) offers numerous functions in the form of the DLL 75. Since the shared-use functions provided by the DLL 75 need not be developed anew, application programs 76 can be developed more efficiently. Because the same program parts are shared by a plurality of application programs 76, savings in disk and memory capacities are considerable.

The application program 76 is any one of software programs used on the personal computer 21 to achieve various objectives such as editing documents, performing spreadsheet operations, creating databases, exchanging e-mails, and browsing Web pages. When designed to utilize a DLL 75 for its objective, the application program 76 can operate only if the necessary DLL 75 is provided.

Under Windows (R) (i.e., OS 74), dynamic links are used by the application program 76 in calling up functions as part of the codes which constitute processes to be carried out and which are other than the codes of its own. The executable codes of the functions are included in the DLL 75.

FIG. 5 is a schematic view showing relations between software and hardware modules carried out by a signal processing application program of an embodiment of the present invention using the CPU 31 of the personal computer 21 in conjunction with a typical application program. What follows is an example in which the inventive signal processing application program performs signal processing on audio data. In FIG. 5, solid lines denote flows of audio data and broken lines represent exchanges of control information.

A typical application program 101 has general audio reproduction functions and complies with Windows (R). In carrying out audio data reproduction, the application program 101 supplies the audio data to be reproduced to Winmm.dll 102.

Winmm.dll 102 is one of the modules constituting Windows (R) and manages a plurality of audio user mode drivers. Based on registry settings, Winmm.dll 102 supplies an appropriate audio user mode driver with control signals and audio data sent from other modules.

Audio data hook dll 103 is a user mode driver that operates during a process of the typical application program 101. The audio data hook dll 103 acquires (i.e., hooks) the audio data supplied from the typical application program 101 to Winmm.dll 102, sends the acquired audio data to a signal processing application program 104, and receives the audio data having undergone signal processing. The audio data hook dll 103 again supplies the processed audio data to Winmm.dll 102 thereby to send the audio data to a user mode driver (Wdmaud.drv 105 in this example) set as an output destination driver by the signal processing application program 104.

The registry may need to be set in order to get the audio data hook dll 103 executed during a process of the typical application program 101 and to acquire the audio data supplied from the typical application program 101 to Winmm.dll 102. More specifically, the audio data hook dll 103 is stored under Windows¥System32; a character string "wav" is created in a registry key HKEY_LOCAL_MACHINE¥SOFTWARE¥-Microsoft¥Windows NT¥CurrentVersion¥Drivers32 (this register key applies to Windows (R) NT serving as the OS); and a file name corresponding to the audio data hook dll 103 is written to the created character string. This allows the audio data hook dll 103 to be additionally recognized as a user mode driver. If the character string "wav" already exists, another character string "wav1" is created; if the character string "wav1" already exists, then another character string "wav2" is created.

The operations above cause Windows (R) to recognize the audio data hook dll 103 as an audio device; the audio data hook dll 103 is now recognized as an audio device by each application program to be executed. Illustratively, on a typical setting screen of Windows (R) (e.g., "Properties of sound and audio devices—Audio—Default devices"), the audio data hook dll 103 is displayed as an audio device. When the typical application program 101 selects and sets the audio data hook dll 103 as a user mode driver for audio reproduction, the audio data hook dll 103 can acquire the audio data sent to Winmm.dll 102 from the application program 101.

The signal processing application program 104 causes effect plug-ins to perform signal processing on the audio data supplied from the audio data hook dll 103, and sends the audio data thus processed back to the audio data hook dll 103. The processed audio data fed to the audio data hook dll 103 is supplied to the user mode driver set as an output destination device by the signal processing application program 104. That is, where Wdmaud.drv 105 is set as the output destination driver by the signal processing application program 104, the audio data processed for effects is forwarded from the audio data hook dll 103 to Wdmaud.drv 105 via Winmm.dll 102. The settings of the output destination driver will be discussed later.

The signal processing application program 104 operates in a process independent of the audio data hook dll 103. In other words, the signal processing application program 104 operates in a process independent of the typical application program 101. For that reason, during signal processing by effect plug-ins, the signal processing application program 104 can control the period in which to retain halfway status and parameter settings of the signal processing in an internal memory, independently of whether or not the typical application program 101 is active. Alternatively, the signal processing application program 104 may be activated automatically upon log-on of Windows (R) and kept resident until log-off.

Wdmaud.drv 105 is a standard audio user mode driver of Windows (R). As such, Wdmaud.drv 105 sends supplied audio data to a WDM audio driver 106. The WDM audio driver 106 is a kernel mode driver that directly exchanges data with audio hardware 107. The audio hardware 107 corresponds illustratively to a sound board that allows the speakers 54 of the output unit 37 in FIG. 3 to effect sound output. That is, the audio hardware 107 is hardware designed for audio output.

FIG. 6 is a function block diagram outlining functions that may be implemented by the audio data hook dll 103 in FIG. 5 and the signal processing application program 104 being carried out. In FIG. 6, a data hook processing unit 121 is a function that may be implemented by the audio data hook dll 103. A signal processing unit 123 is a function that may be implemented by the signal processing application program 104. A shared memory area 122 is a storage area in the RAM 36 which is used by the audio data hook dll 103 in FIG. 5 and the signal processing application program 104 being carried out.

A setting control unit 141 in the data hook processing unit 121 controls the operations of a data acquisition unit 142, an output control unit 143, a fixed-float conversion processing unit 144, a limiter processing unit 145, and a float-fixed conversion processing unit 146 based on diverse kinds of information necessary for processing execution. Such information is illustratively constituted by whether a format area 151 is set in the shared memory area 122 or whether the signal processing unit 123 is currently processing audio data when a particular function is called up from Winmm.dll 102. Necessary information is written by the setting control unit 141 to the format area 151 in the shared memory area 122.

The data acquisition unit 142 acquires audio data from Winmm.dll 102 and sends the acquired data to the output control unit 143. Under control of the setting control unit 141, the output control unit 143 either sends the supplied audio data to the fixed-float conversion processing unit 144 in order to write the data to a data area 152 in the shared memory area 122, or outputs the supplied data to Winmm.dll 102.

The fixed-float conversion processing unit 144 converts into floating-point format the audio data in integer format coming from the output control unit 143. The conversion is made for two reasons: because the audio data supplied in integer format from the typical application program 101 needs to be converted to floating-point format so that an effect processing unit 167, to be discussed later, in the signal processing unit 123 may operate on the data in floating-point format; and because conversion of the data into floating-point format eliminates the need for the signal processing unit 123 to take into account the bit length of the original audio data.

The limiter processing unit 145 reads from the data area 152 the processed audio data in floating-point format, and performs a limiter process on the retrieved data (i.e., rounds the data to within predetermined maximum and minimum values) so that the audio data will not overflow when converted to integer format by the float-fixed conversion processing unit 146, to be discussed later. The float-fixed conversion processing unit 146 converts the floating-point format audio data having undergone the limiter process back to the integer data of the original bit length, and sends the converted data to the output control unit 143.

The format area 151 in the shared memory area 122 is a storage area via which the data hook processing unit 121 and signal processing unit 123 exchange control data and setting data such as the sampling frequency of audio data, channel count, output device name, and audio data size. When the signal processing unit 123 is functionally enabled, the format area 151 is created by a setting control unit 163, to be discussed later, in the signal processing unit 123. The data area 152 is a storage area via which the data hook processing unit 121 and signal processing unit 123 exchange audio data.

An operation input acquisition unit 161 in the signal processing unit 123 acquires the user's operation input coming from the input unit 34 and supplies the acquired input to a display control unit 162, the setting control unit 163, and an effect setting unit 164.

The display control unit 162 controls diverse GUI (graphic user interface) displays that prompt the user to make operation input. Illustratively, the display control unit 162 causes the display device 53 of the output unit 37 to give GUI screens shown in FIGS. 7 through 9.

Figure 7:
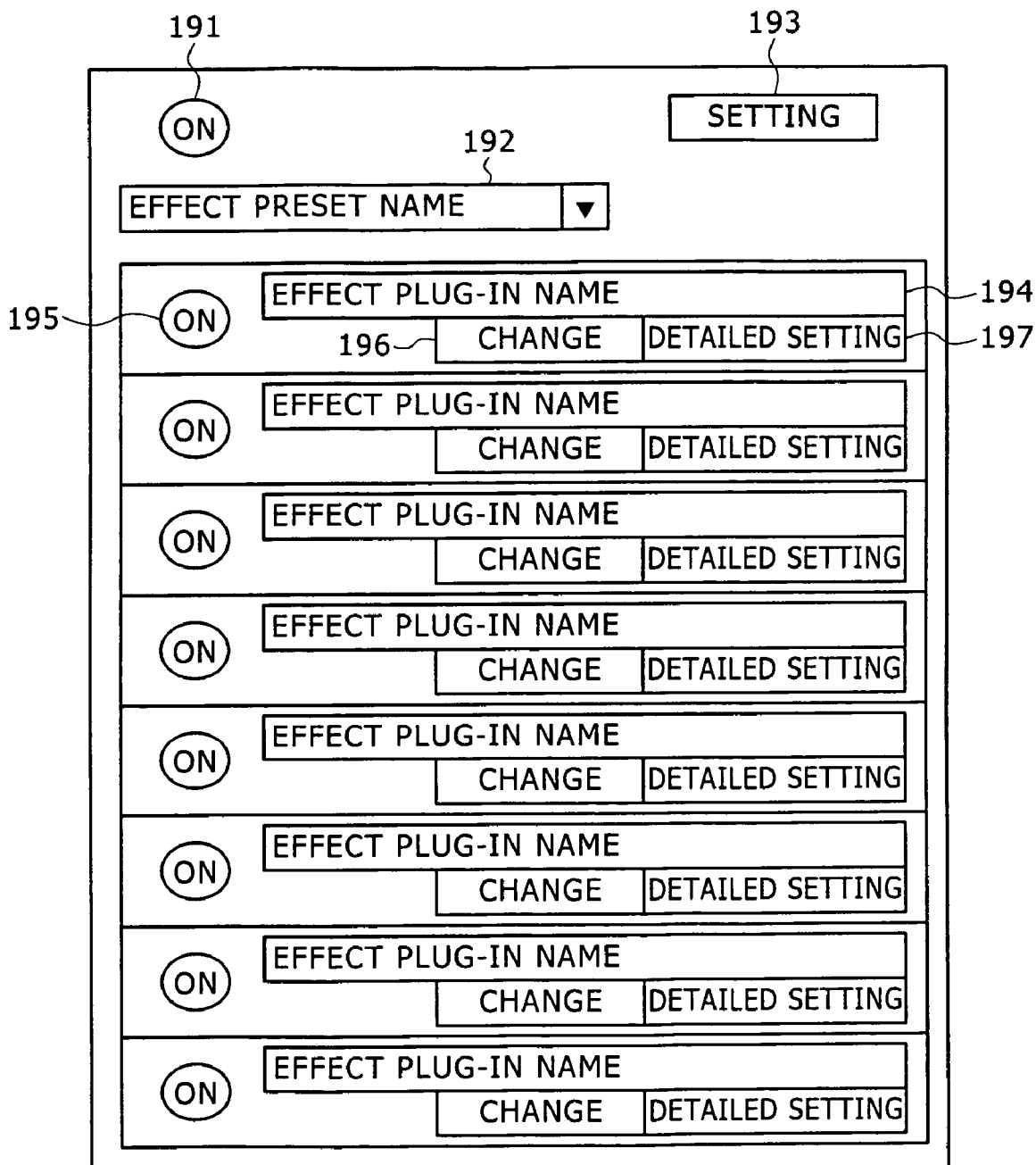
FIG. 7 is a schematic view of a typical setting window on display.

FIG. 7 is a schematic view of a typical setting window 181 that allows the user to set the signal processing unit 123 (i.e., signal processing application program 104). In FIG. 7, a button 191 is operated by the user to specify whether or not to let the signal processing unit 123 carry out its processing. When the button 191 bears characters "ON" as shown in FIG. 7, the signal processing unit 123 proceeds with its processing; when the button 191 bears characters "OFF," the signal processing unit 123 is left inactive. If the signal processing unit 123 is set to perform its processing, the format area 151 is created in the shared memory area 122. If the signal processing unit 123 is not arranged to carry out its processing, the format area 151 will not be created in the shared memory area 122. In that case, the setting control unit 141 in the data hook processing unit 121 causes the output control unit 143 to send supplied audio data to Wdmaud.drv 105 via Winmm.dll 102.

An effect preset name setting box 192 is a drop-down list box that can indicate a list of currently designated effect preset names. An effect preset name is a suitable preset name associating a sequence of effect plug-ins with parameters for management purposes. The user can select any of the effect preset names displayed in the effect preset name setting box 192 in order to establish a desired effect plug-in sequence and parameters.

A setting button 193 is selected by the user to get a setting screen (to be described later with reference to FIG. 8) displayed. The setting screen allows the user to make more detailed settings.

Text boxes 194 indicate the names of effect plug-ins (171-1 through 171-n in FIG. 6, to be discussed later) which are set by the signal processing unit 123 for signal processing. Buttons 195 are each used to specify whether or not to carry out the process applicable to the effect plug-in whose name is shown in the corresponding text box 194. Where the button 195 bears characters "ON" as shown in FIG. 7, the signal processing unit 123 gives effects to the supplied audio data using the effect plug-in named in the corresponding text box 194; when the button 195 bears characters "OFF," the signal processing unit 123 is barred from using the effect plug-in named in the corresponding text box 194.

Figure 9:
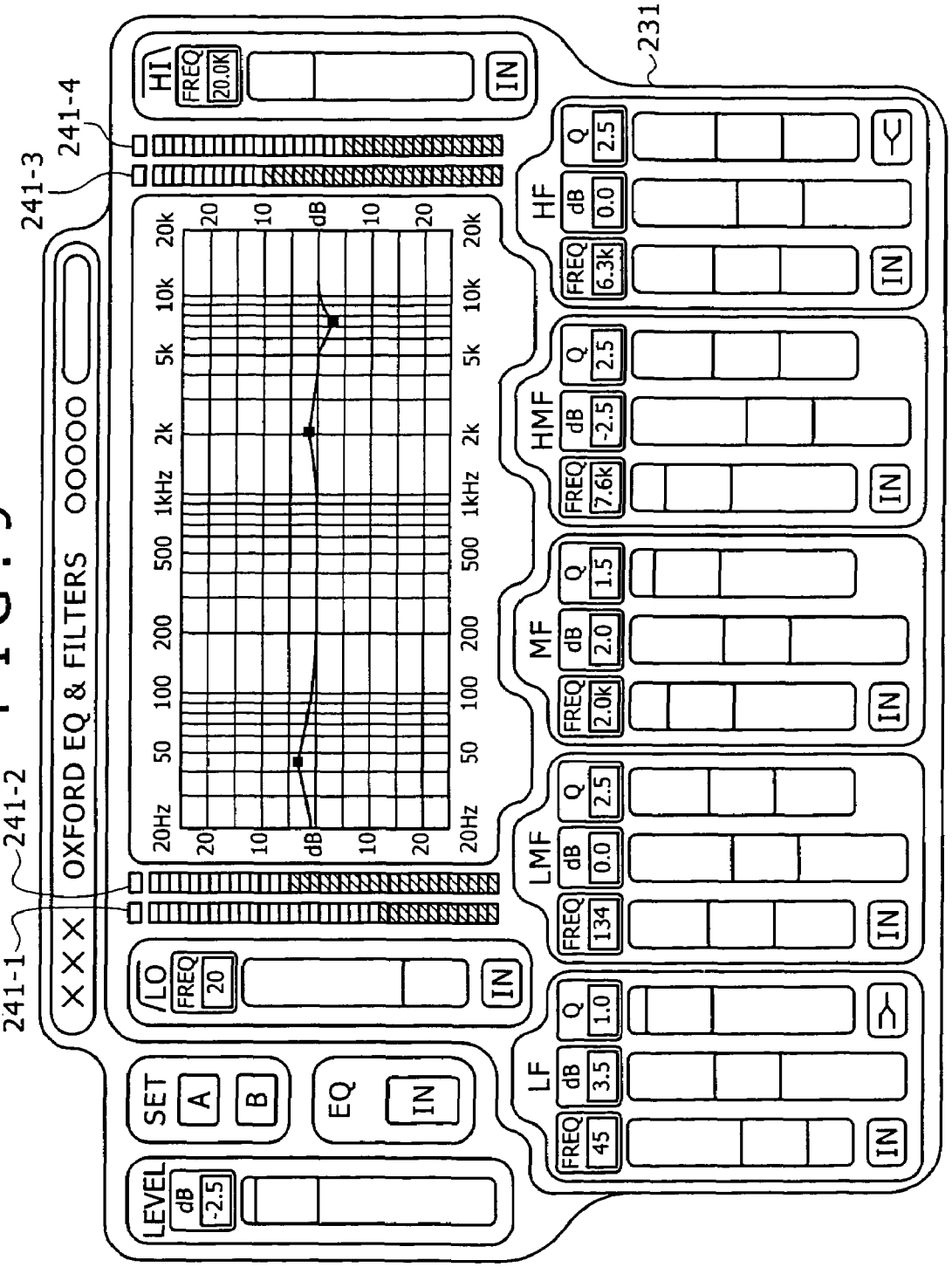

Change buttons 196 are operated to change the effect plug-ins displayed in the text boxes 194. Clicking on a given change button 196 causes illustratively the corresponding text box 194 to display a list of available effect plug-ins. When the user selects a desired effect plug-in from the text box 194, the setting of the text box 194 is changed to the selected effect plug-in being displayed. Detailed setting buttons 197 are each selected by the user illustratively to get a detailed setting screen displayed as shown in FIG. 9. The detailed setting screen is part of a display function provided by the effect plug-in named in the corresponding text box 194, whereby detailed settings are made for the displayed plug-in.

Figure 8:
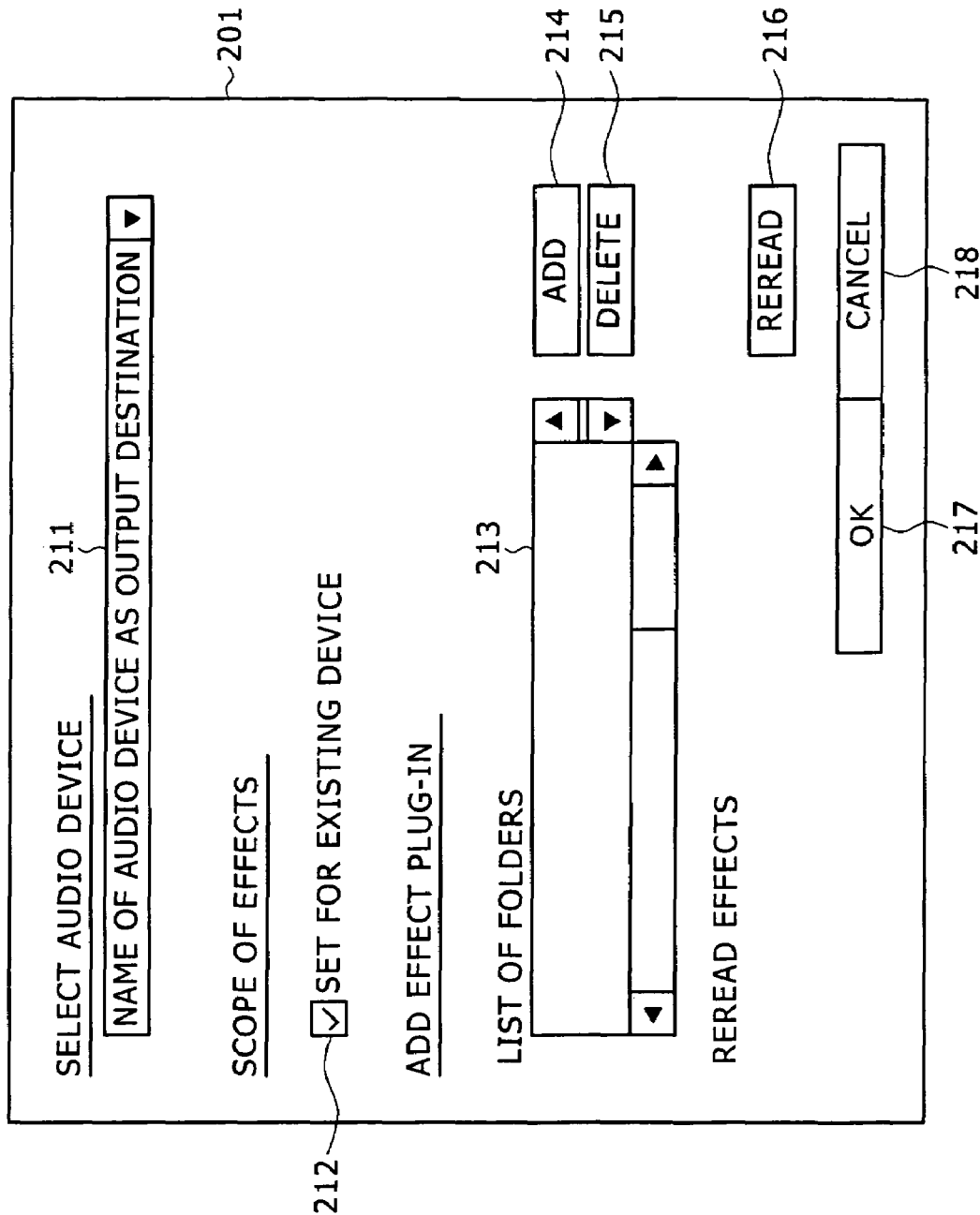
FIG. 8 is a schematic view of a typical setting screen.

FIG. 8 is a schematic view of a typical setting screen 201 displayed when the user selects the setting button 193 in the setting window 181 explained above with reference to FIG. 7. In FIG. 7, an audio device selection box 211 is a drop-down list box that permits selection of the name of an audio device as an output destination for the audio data processed by the signal processing unit 123. The audio device selection box 211 displays a list of audio devices (user mode drivers) each selectable as the output destination for audio data. When the user selects something desired from the display in the audio device selection box 211, the audio device to which the signal processing unit 123 outputs processed audio data is established. What is established is the output destination (Wdmaud.drv 105 in FIG. 5) for the audio data supplied from the signal processing application program 104 (described above with reference to FIG. 5) to Winmm.dll 102 via the audio data hook dll 103.

A check box 212 is used to specify whether or not to set the scope of effects for an existing device of Windows (R). That is, when the audio data hook dll 103 is set as the default device for Windows (R), the scope of effects is set for the audio data hook dll 103. The same setting is also available on a predetermined setting screen of Windows (R) other than the setting screen 201.

A folder list box 213 is displayed when one of the change buttons 196 (discussed above with reference to FIG. 7) is clicked on. The folder list box 213 shows a list of folders such as dll files constituting effect plug-ins in the corresponding text box that indicates a list of available effect plug-ins. The user may click on an add button 214 to add a new folder to the folder list box 213; the user may also click on a delete button 215 to delete a desired folder from the folder list box 213. Any of the folders such as dll files constituting the effect plug-ins in the folder list box 213, when set as described, is not copied illustratively to a program execution area in the RAM 36 but merely assigned a file path.

When a group of folders included in the folder list box 213 is changed, a reread button 216 is operated to reread the changed folder group. The reread button is selected to update information in the text box showing a list of available effect plug-ins displayed when one of the change buttons 196 is clicked on in the setting window 181 (explained above with reference to FIG. 7).

An OK button 217 is selected by the user to finalize the above-described setting changes on the setting screen 201 and to again display the setting window 181 of FIG. 7 replacing the setting window 201. A cancel button 218 is selected by the user to cancel the above-described setting changes on the setting screen 201 and to again display the setting window 181 of FIG. 7 replacing the setting window 201.

FIG. 9 is an explanatory view of a detailed setting screen 231 that appears when one of the detailed setting buttons 197 is clicked on in the setting window 181 of FIG. 7. The setting screen 231 is displayed by the effect plug-in displayed in the text box 194 so as to permit detailed settings for the effect plug-in in question.

Figure 2:
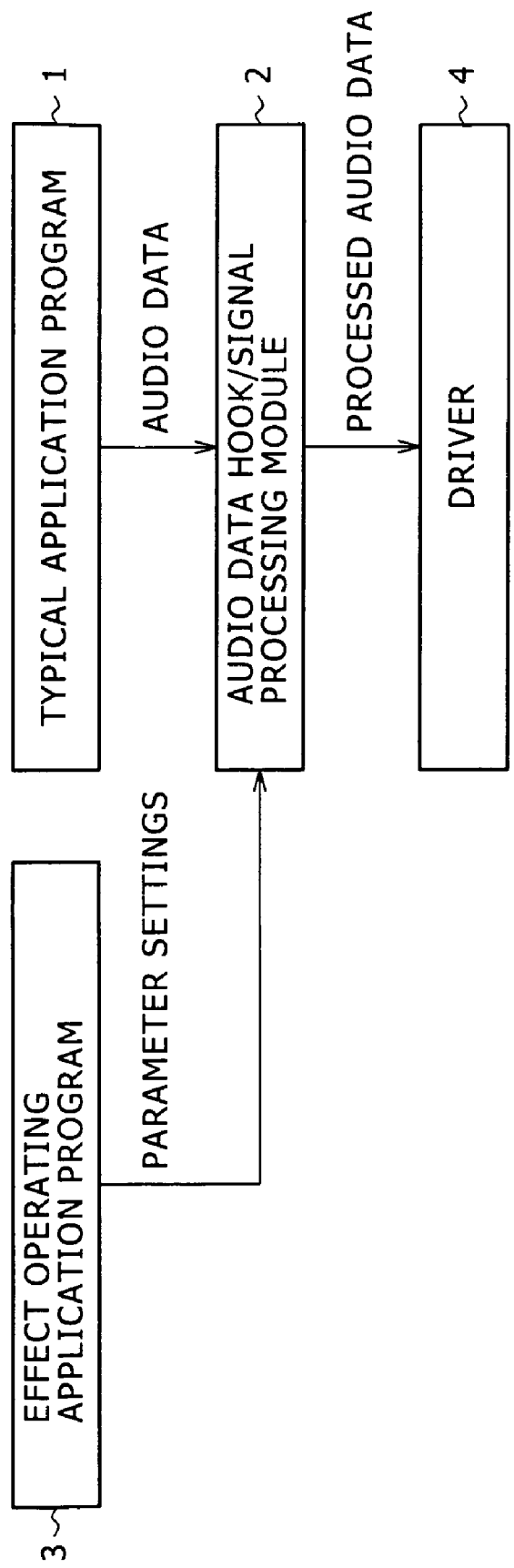
FIG. 2 is an explanatory view showing a structure of modules in effect when a related-art effect operating application program is used.

The detailed setting screen 231 is dependent on the type of effect plug-ins 171-1 through 171-n of the effect processing unit 167, to be discussed later. The signal processing application program 104 corresponding to the signal processing unit 123 is capable of processing audio data by itself, unlike the past effect parameter operating application program 3 described above with reference to FIG. 2. The detailed setting screen 231 is arranged to display level meters 241-1 through 241-4.

Returning to the description of FIG. 6, the setting control unit 163 controls the effect setting unit 164, a data acquisition unit 166, a smoothing processing unit 168, and a data output control unit 169, based on the user's operation input from the operation input acquisition unit 161 as well as on various control signals and parameters written in the format area 151.

The effect setting unit 164 controls the settings and processes of the effect processing unit 167 based on the user's operation input from the operation input acquisition unit 161 and under control of the setting control unit 163. As needed, the effect setting unit 164 sends setting information about the effect processing unit 167 to a setting hold control unit 165. The setting hold control unit 165 temporarily stores on the HDD 38 the setting information about the effect processing unit 167 coming from the effect setting unit 164. Under control of the effect setting unit 164, the setting hold control unit 165 reads out the temporarily stored setting information and supplies the retrieved information to the effect setting unit 164.

Under instructions from the setting control unit 163, the data acquisition unit 166 reads out and acquires audio data from the data area 152 in the shared memory area 122. The acquired audio data is supplied by the data acquisition unit 166 to the effect processing unit 167.

The effect processing unit 167 gives effects to the supplied audio data using the effect plug-ins 171-1 through 171-n ("n" is a positive integer) set by the user on the setting window 181 of FIG. 7 and on the setting screen 201 of FIG. 8. The audio data processed for effects is sent to the smoothing processing unit 168. The effect plug-ins 171-1 through 171-n may illustratively include DirectX Plugin and VST Plugin.

The smoothing processing unit 168 carries out a smoothing-out process to suppress a "pop" noise stemming from a discontinuity that occurs in the output audio data when a signal processing configuration is changed. For the signal processing unit 123, the user may change the configuration and sequence of the effect plug-ins 171-1 through 171-n or may bypass the user-designated effects on the setting window 181 of FIG. 7 and on the setting screen 201 of FIG. 8. Such changes, when carried out, produce a discontinuity in the output audio data resulting in the noise. Generation of the noise is circumvented by the smoothing processing unit 168 smoothing out the audio data having been processed by the effect processing unit 167. The smoothed-out audio data is output to the data output control unit 169.

Figure 10:
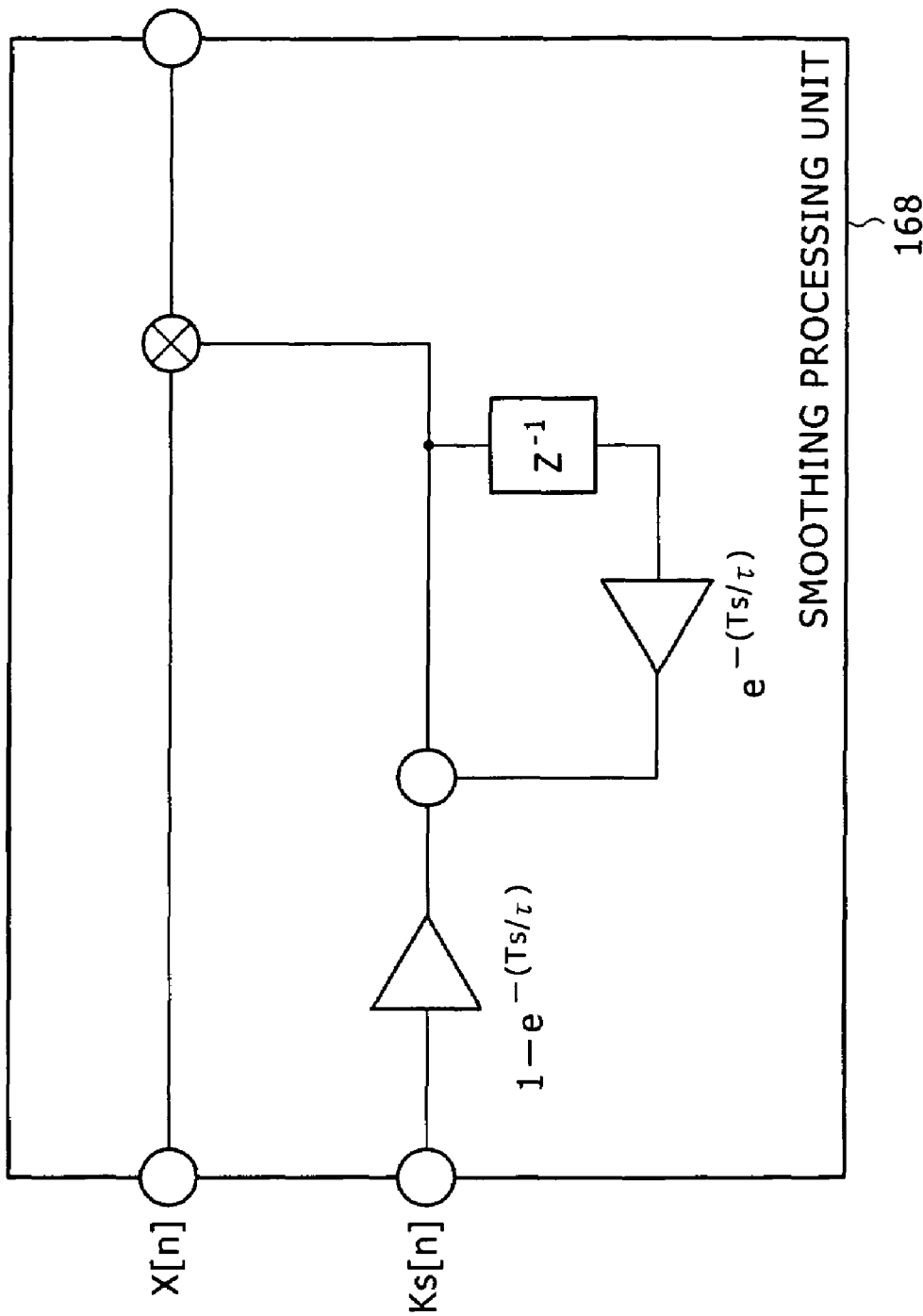
FIG. 10 is an explanatory view showing how a smoothing processing unit in FIG. 6 works.

The smoothing processing unit 168 has a smoothing function implemented by the circuit shown in FIG. 10. In FIG. 10, x[n] denotes discrete data derived from the audio data fed to the smoothing processing unit 168, and Ks[n] represents a coefficient (e.g., Ks[n]=1 for the smoothing processing unit 168). If n=0 at the start of smoothing, the circuit is started with an initial value of 0 for $[Z^{-1}]$ and Ks[n]=1. This allows the output volume of X[n] to rise slowly, thereby suppressing the noise in the output audio data.

Under control of the setting control unit 163, the data output control unit 169 writes the audio data coming from the smoothing processing unit 168 to the data area 152 in the shared memory area 122.

The workings of the software modules explained above with reference to FIG. 5 will now be described by referring to the arrow chart of FIG. 11.

In step S31, the typical application program 101 calls up the waveoutOpen function of Winmm.dll 102 in order to start a process for outputting audio data to the audio data hook dll 103 that is set as the default user mode driver.

In step S32, Winmm.dll 102 calls up the wodMessageOpen function of the audio data hook dll 103 designated as the user mode driver.

The audio data hook dll 103 verifies whether there exits the format area 151 in the shared memory area 122, and writes to the area the sampling frequency and channel count in effect (in what is called an open verification process, to be discussed later with reference to FIG. 13). In step S33, the audio data hook dll 103 outputs OpenEvent to the signal processing application program 104.

Upon receipt of OpenEvent, the signal processing application program 104 carries out a process for opening (i.e., open process, to be discussed later with reference to FIG. 14). In step S34, the signal processing application program 104 outputs OpenFinishedEvent to the audio data hook dll 103.

In step S35, the audio data hook dll 103 calls up the waveoutOpen function of Winmm.dll 102 in order to open Wdmaud.drv 105 designated as the output destination driver by the signal processing application program 104.

In step S36, Winmm.dll 102 calls up the wodMessageOpen function of Wdmaud.drv 105 designated as the output destination driver by the signal processing application program 104. More details of the open process outlined above in steps S31 through S36 will be described later with reference to FIG. 12.

In step S37, the typical application program 101 calls up the waveoutWrite function of Winmm.dll 102 in order to write audio data to the audio data hook dll 103 established as the default user mode driver.

In step S38, Winmm.dll 102 calls up the wodMessageWrite function of the audio data hook dll 103 designated as the user mode driver.

Figure 17:
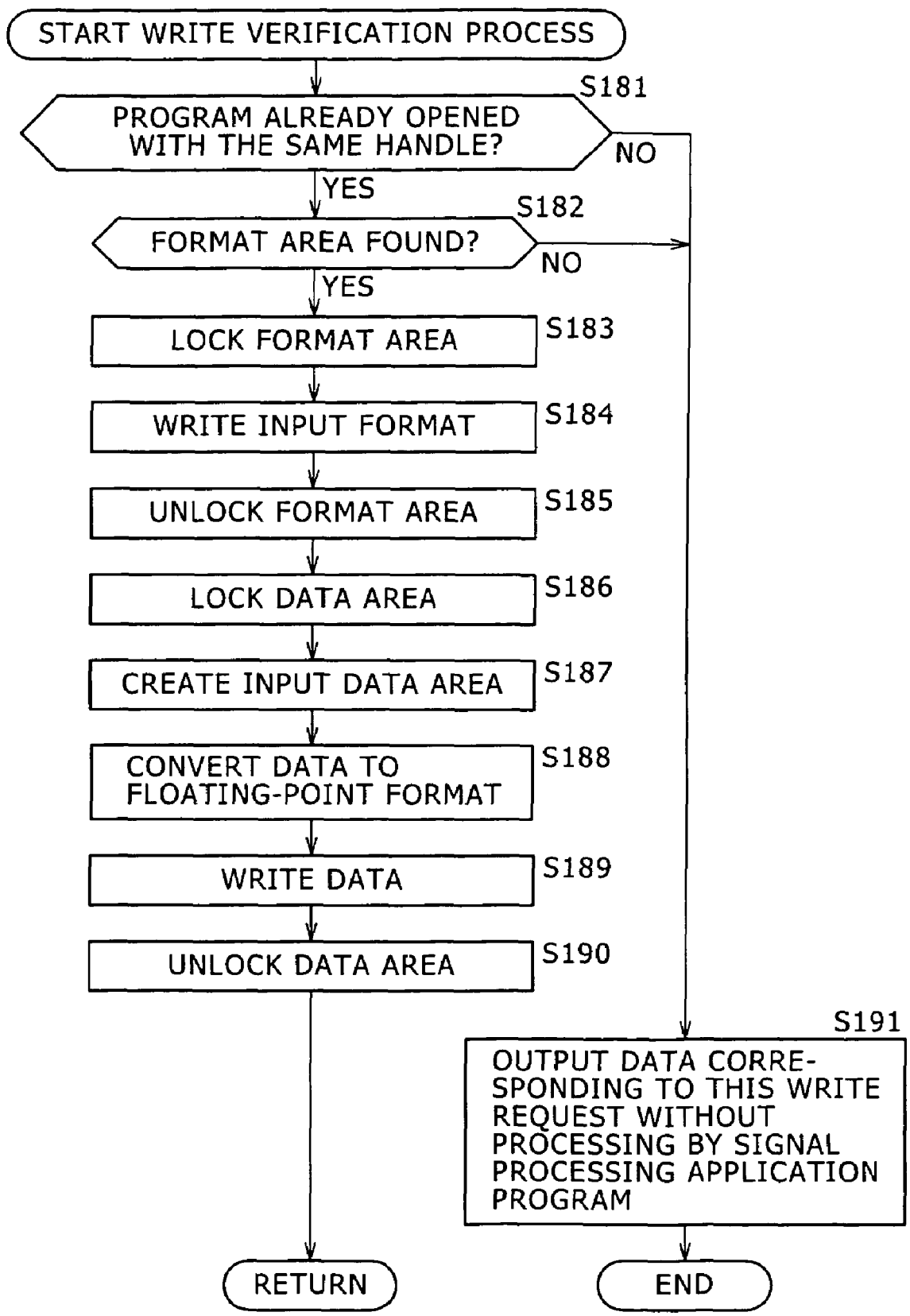
FIG. 17 is a flowchart of steps constituting a write verification process.

The audio data hook dll 103 verifies whether the signal processing application program 104 is ready to process the audio data, and writes an input format and the audio data to the shared memory area 122 (in what is called a write verification process, to be discussed later with reference to FIG. 17). In step S39, the audio data hook dll 103 outputs InputEvent to the signal processing application program 104.

Upon receipt of InputEvent, the signal processing application program 104 in step S40 acquires the audio data, gives effects to the acquired data, and writes the processed audio data to the shared memory area 122 (in what is called a data effect process, to be described later with reference to FIG. 18).

In step S41, the signal processing application program 104 outputs OutputEvent to the audio data hook dll 103.

In step S42, the audio data hook dll 103 calls up the waveoutWrite function of Winmm.dll 102 in order to output the audio data coming from the signal processing application program 104 to Wdmaud.drv 105 designated as the output destination driver by the signal processing application program 104. The audio data is thus fed to Winmm.dll 102.

In step S43, Winmm.dll 102 calls up the wodMessageWrite function of Wdmaud.drv 105 designated as the output destination driver by the signal processing application program 104, and sends the audio data to Wdmaud.drv 105.

The write process above is repeated until the current series of audio data has all been processed between the open process and the close process. More details of the write process outlined above in steps S37 through S43 will be discussed later with reference to FIG. 16.

In step S44, the typical application program 101 calls up the waveoutClose function of Winmm.dll 102 in order to report to the audio data hook dll 103, set as the default user mode driver, that writing of the audio data has ended.

In step S45, Winmm.dll 102 calls up the wodMessageClose function of the audio data hook dll 103 designated as the user mode driver. The audio data hook dll 103 verifies whether the signal processing application program 104 processed the audio data of which the write end report has been made (in what is called a close verification process, to be described later with reference to FIG. 21). In step S46, the audio data hook dll 103 outputs CloseEvent to the signal processing application program 104.

In step S47, the signal processing application program 104 closes the plug-ins and outputs CloseFinishedEvent to the audio data hook dll 103.

In step S48, the audio data hook dll 103 calls up the waveoutClose function of Winmm.dll 102 in order to report to Wdmaud.drv 105, designated as the output destination driver by the signal processing application program 104, that writing of the audio data has ended.

In step S49, Winmm.dll 102 calls up wodMessageClose function of Wdmaud.drv 105 designated as the output destination driver by the signal processing application program 104. More details of the close process outlined above in step S44 through S49 will be discussed later with reference to FIG. 20.

The processing above makes it possible to give effects to the audio data output by the typical application program 101 through the use of the effect plug-ins 171-1 through 171-n such as DirectX Plugin and VST Plugin, and to output the audio data processed for effects.

Figure 1:
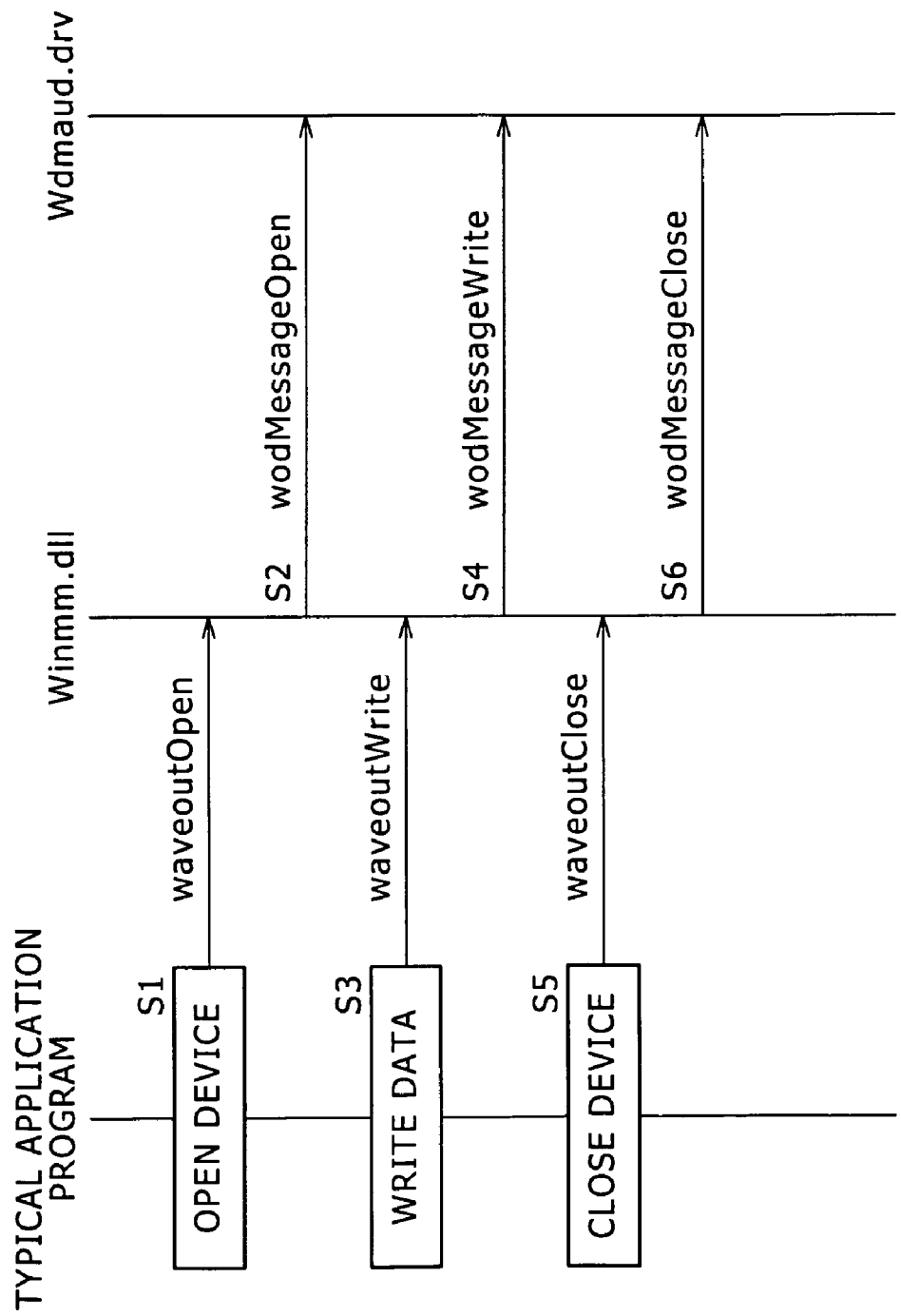
FIG. 1 is an arrow chart showing how audio data is reproduced in related art.
Figure 11:
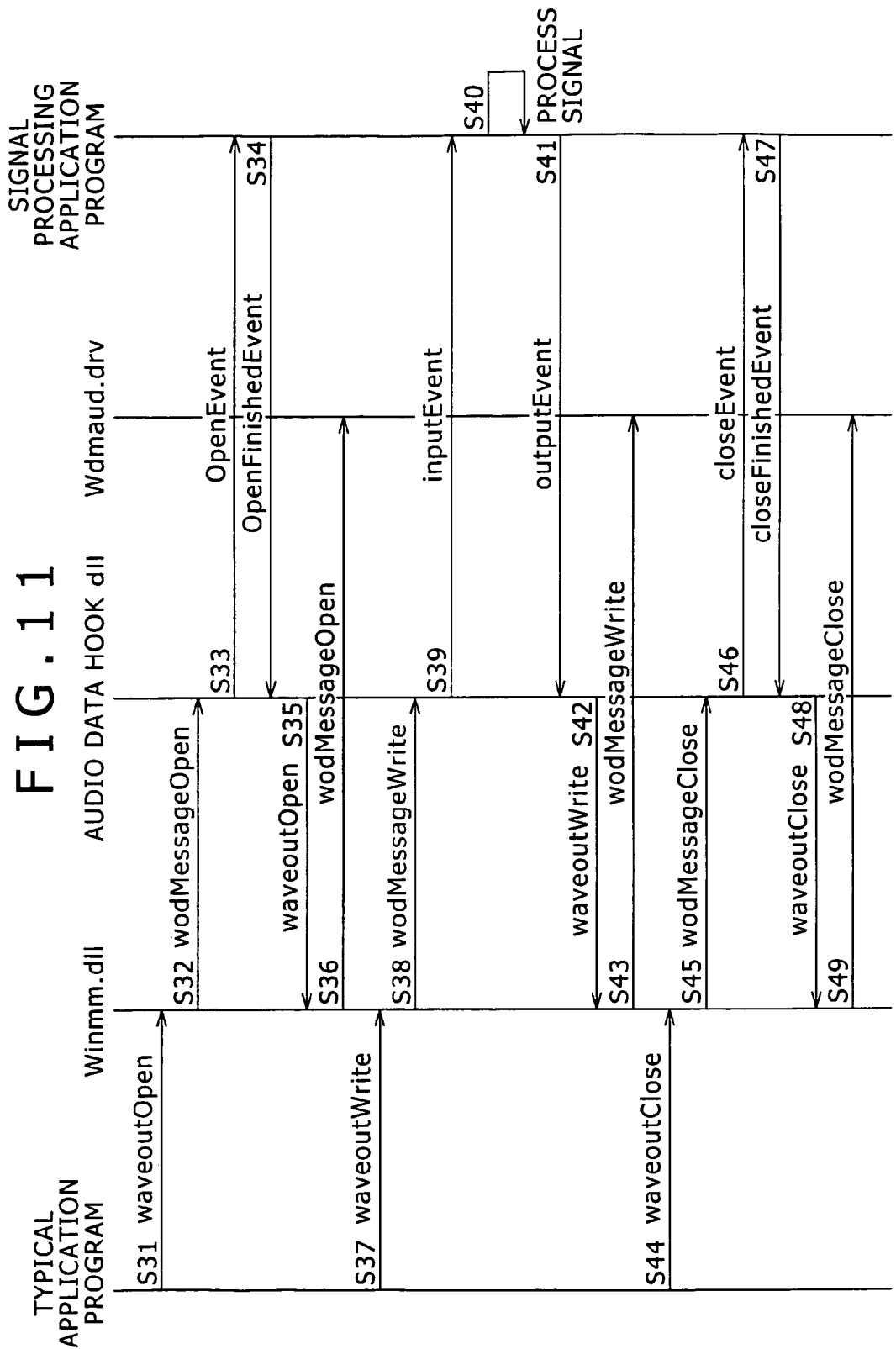
FIG. 11 is an arrow chart showing how the software modules shown in FIG. 5 operate.

That is, when the signal processing application program 104 of an embodiment of the present invention is used to give effects to the audio data output by the typical application program 101, what takes place supplements the past practiced processing outlined in FIG. 1 with steps S32 through S35, S38 through S42, and S45 through S48 shown in FIG. 11.

The open process will now be described in more detail with reference to the arrow chart of FIG. 12. In step S61, the typical application program 101 calls up the waveoutOpen function of Winmm.dll 102 in order to start a process for outputting audio data to the audio data hook dll 103 set as the default user mode driver (equivalent to the processing of step S31 in FIG. 11).

In step S62, Winmm.dll 102 calls up the wodMessageOpen function of the audio data hook dll 103 designated as the user mode driver (equivalent to the processing of step S32 in FIG. 11). At this point, Winmm.dll 102 uses a WAVEFORMATEX structure to supply information such as the channel count, sampling frequency, and data bit count in effect to the audio data hook dll 103.

In step S63, the audio data hook dll 103 performs an open verification process, to be discussed later with reference to FIG. 13. In step S64, the audio data hook dll 103 outputs OpenEvent to the signal processing application program 104 (equivalent to the processing of step S33 in FIG. 11).

In step S65, the signal processing application program 104 performs an open process, to be discussed later with reference to FIG. 14. In step S66, the signal processing application program 104 outputs OpenFinishedEvent to the audio data hook dll 103 and supplies the dll 103 with information representative of the device name designated as the output destination (i.e., the name of the driver for driving the device in question; the step corresponds to the processing of step S34 in FIG. 11).

In step S67, the audio data hook dll 103 stores the device name designated as the output destination device by the signal processing application program 104 (i.e., the name of the driver for driving the device). In step S68, the audio data hook dll 103 calls up the waveoutOpen function of Winmm.dll 102 in order to open Wdmaud.drv 105 which is the designated driver (equivalent to the processing of step S35 in FIG. 11).

In step S69, Winmm.dll 102 calls up the wodMessageOpen function of Wdmaud.drv 105 designated as the output destination driver by the signal processing application program 104 (equivalent to the processing of step S36 in FIG. 11).

In step S70, Wdmaud.drv 105 generates a handle that individually distinguishes the output process of the audio data. In step S71, Wdmaud.drv 105 reports an open end response and the generated handle to Winmm.dll 102.

In step S72, Winmm.dll 102 reports an open end response and the generated handle to the typical application program 101. In step S73, the typical application program 101 stores the handle it has received.

In step S74, Winmm.dll 102 reports an open end response and the generated handle to the audio data hook dll 103. In step S75, the audio data hook dll 103 sets an opened flag and stores the handle it has received, thereby terminating the open process.

Generally, a user mode driver can accept audio data reproduction requests from a plurality of applications programs simultaneously. In other words, even as an application program is opening a user mode driver, another application program may open the same user mode driver at the same time.

However, the signal processing carried out by the effect processing unit 167 in the signal processing unit 123 may sometimes involve generating the current signal by use of a past signal. Illustratively, when the effect in use is "echo," the current and past sounds are mixed before they are output. That is, when standard plug-ins are utilized for the signal processing performed by the effect processing unit 167 in the signal processing unit 123 (using the effect plug-ins 171-1 through 171-n), various conditions may need to be considered to provide for varying eventualities of signal processing plug-ins.

More specifically, during signal processing carried out by the effect processing unit 167 in the signal processing unit 123, the processing should be kept continuous without interruption for operations on another audio data. Even if processing of the data is made on a discrete basis, the continuous data should not be interrupted by operations on other data.

It follows that the signal processing application program 104 cannot process a plurality of data streams simultaneously. When one application program is opening the audio data hook dll 103, another application program may open the same dll 103 but the signal processing by the signal processing application program 104 will not take place. Instead, the next process (read-out of the waveoutOpen function of Winmm.dll 102) is carried out. In the ensuing write and close processes, various events are not reported to the signal processing application program 104; relevant functions of Winmm.dll 102 are called up and the audio data is output in the same manner as in related-art setups.

Whether the audio data hook dll 103 is already opened by some other application program is known by checking to see if an opened flag is set. Whether a write request and a close request are made by the audio data which first opened the audio data hook dll 103 is known by checking to see if the handles involved match.

Figure 13:
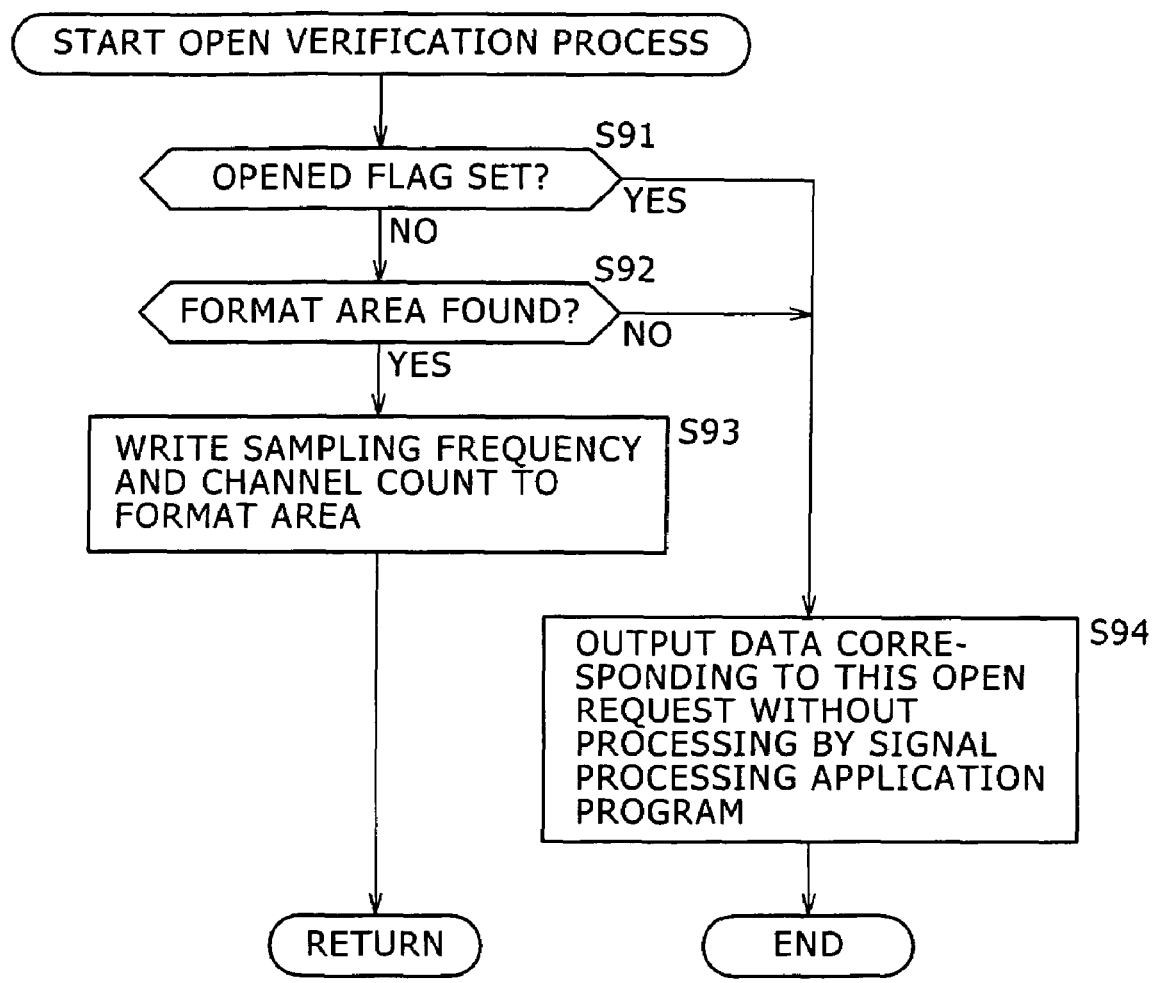
FIG. 13 is a flowchart of steps constituting an open verification process.

Described below with reference to the flowchart of FIG. 13 is the open verification process carried out by the audio data hook dll 103 in step S63.

Figure 12:
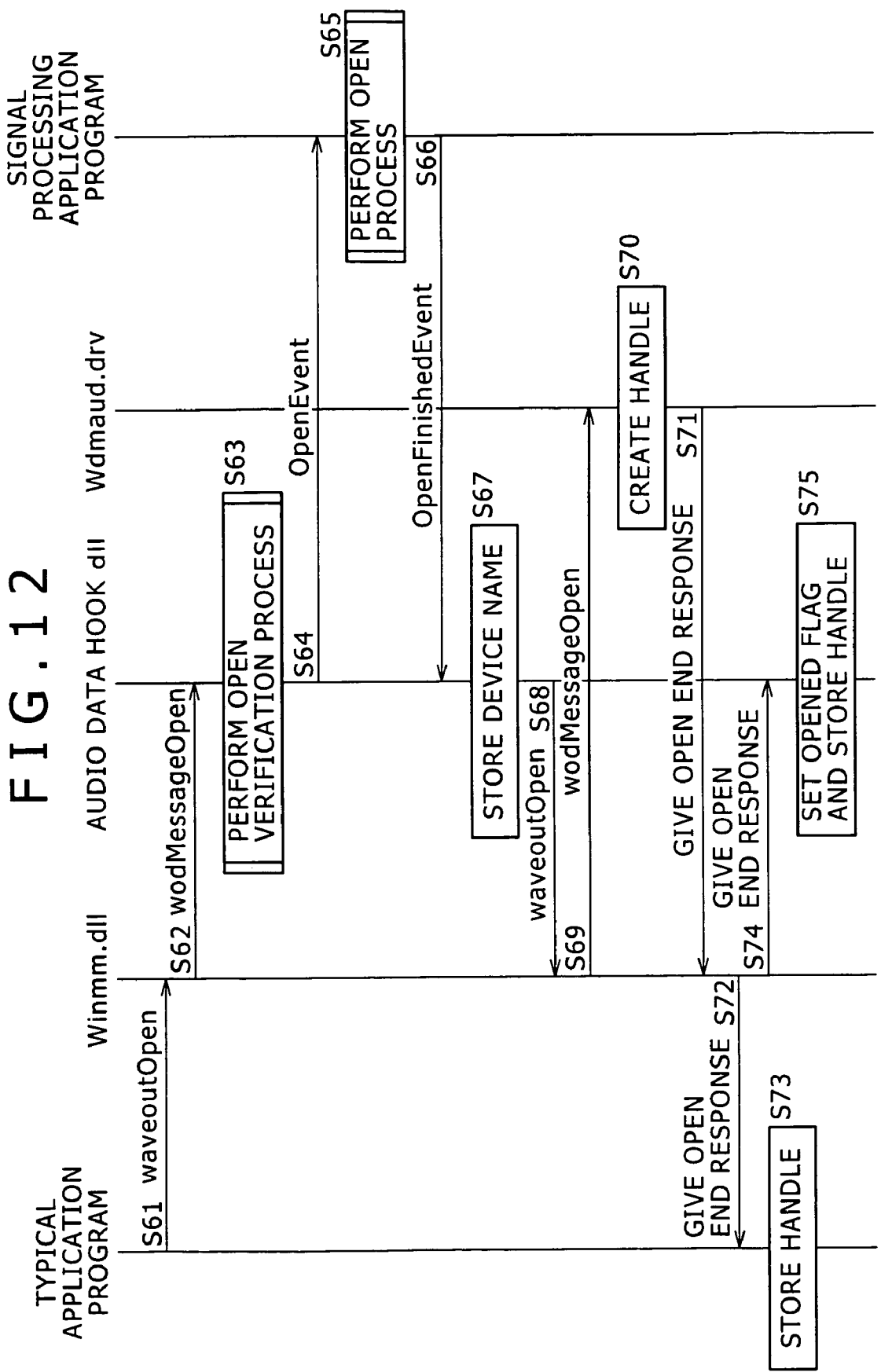
FIG. 12 is an arrow chart showing details of an open process.

In step S91, the setting control unit 141 in the data hook processing unit 121, implemented by the audio data hook dll 103 and described above with reference to FIG. 6, determines at the end of the open process whether the opened flag is set, which should have been set in step S75 of FIG. 12. If in step S91 the opened flag is found to be set, that means the signal processing application program 104, which functionally implements the signal processing unit 123 in FIG. 6, is already processing different audio data. In this case, control is passed on to step S94, to be discussed later.

If in step S91 the opened flag is not found set, then step S92 is reached. In step S92, the setting control unit 141 checks to determine whether the format area 151 exists in the shared memory area 122. Since the signal processing application program 104 is activated independently of the typical application program 101, it might happen that the signal processing unit 123 is not operating (i.e., typical application program 101 is inactive) while the audio data hook processing unit 121 is in operation. For that reason, the setting control unit 141 determines whether the signal processing unit 123 (i.e., typical application program 101) is active on the basis of the presence or absence of the format area 151 in the shared memory area 122. If in step S92 the format area 151 is not found to exist, that means the signal processing unit 123 is not in operation. In that case, control is passed on to step S94, to be discussed later.

If in step S92 the format area 151 is found to exist, then step S93 is reached. In step S93, the setting control unit 141 writes the sampling frequency and channel count to the format area 151 in the shared memory area 122. Control is returned to step S63 and passed on to step S64, whereby OpenEvent is output to the signal processing application program 104.

If in step S91 the opened flag is found to be set or if in step S92 the format area 151 is not found to exist, then step S94 is reached. In step S94, the setting control unit 141 does not process the audio data corresponding to this open request by use of the signal processing application program 104. Instead, the setting control unit 141 in step S94 calls up the waveout Open function of Winmm.dll 102 in order to output the audio data in conventional fashion. In the ensuing write and close processes, the setting control unit 141 does not report events to the signal processing application program 104; the setting control unit 141 calls up relevant functions of Winmm.dll 102 to output the audio data conventionally before terminating the processing (control is not returned to step S63).

In the processing described above, the audio data hook dll 103 determines whether the signal processing application program 104 can currently process the audio data corresponding to this open request. If it is found possible to process the audio data, then OpenEvent is output to the signal processing application program 104.

Figure 14:
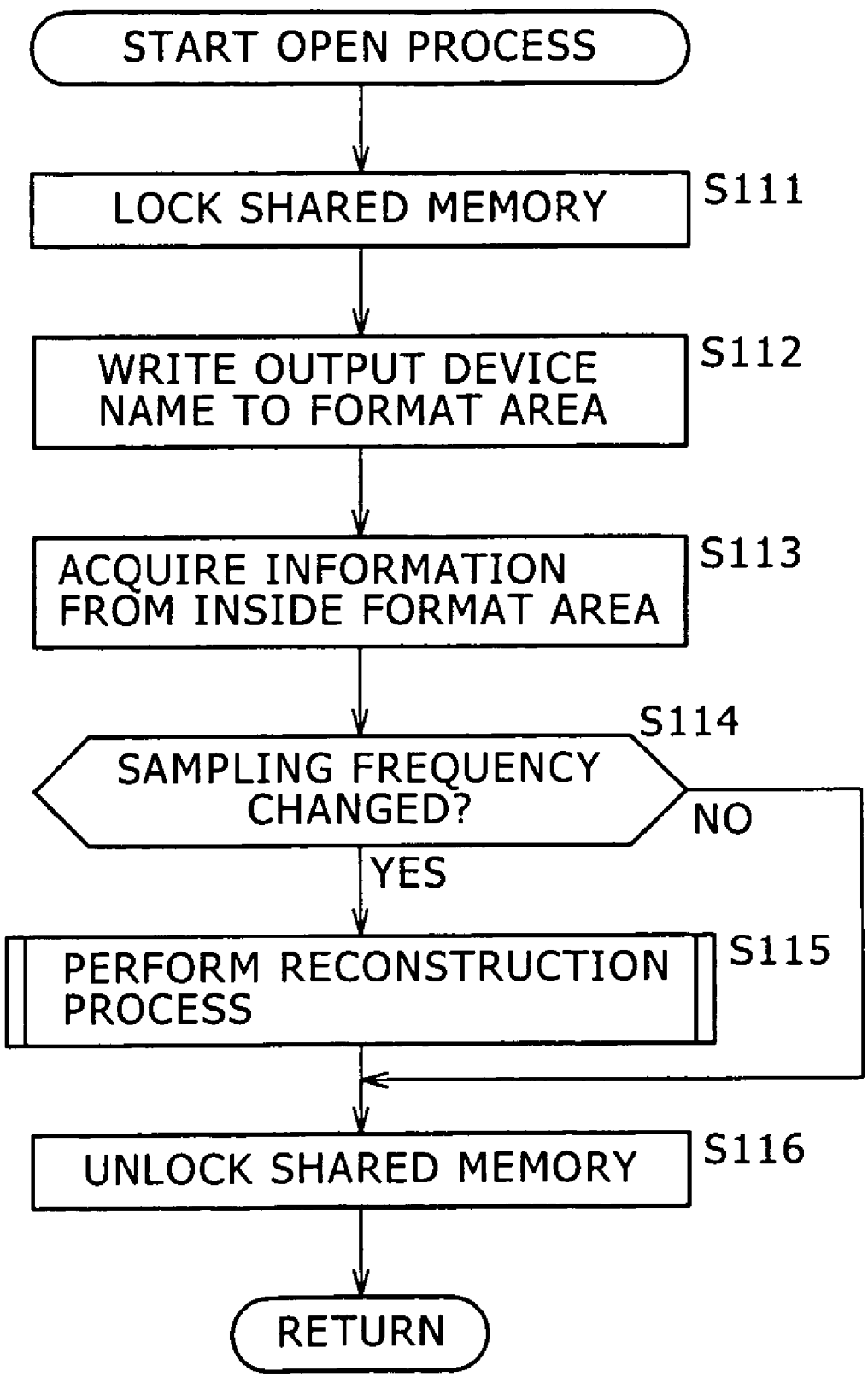
FIG. 14 is a flowchart of steps constituting an open process.

Described below with reference to the flowchart of FIG. 14 is the open process carried out by the signal processing application program 104 in step S65 of FIG. 12.

In step S111, the setting control unit 163 locks the shared memory area 122 to protect the area against attempts at update by any other unit but by itself (i.e., against updating by the audio data hook processing unit 121).

In step S112, the setting control unit 163 writes to the format area 151 in the shared memory area 122 the output device name set in the audio device selection box 211 on the setting screen 201 discussed above with reference to FIG. 8.

In step S113, the setting control unit 163 acquires the sampling frequency and channel count from the format area 151 in the shared memory 122. These items of information in the format area 151 were written there by the setting control unit 141 in step S93 of FIG. 13.

In step S114, the setting control unit 163 determines whether the sampling frequency is changed. In the processing according to this invention, various application programs 101 reproduce audio data at different sampling frequencies. The signal processing application program 104 thus receives signal processing requests at diverse sampling frequencies. Meanwhile, many effect plug-ins 171-1 through 171-n were developed for audio data edition applications. For that reason, if the sampling frequency is changed halfway through a process, there could be problems such as a GUI failing to comply with the changed sampling frequency or regarding the change as an error and handling it as such.

If in step S114 the sampling frequency is found to have been changed, step S115 is reached. In step S115, a reconstruction process is performed in a manner to be described later with reference to the flowchart of FIG. 15.

Step S116 is reached in one of two cases: if in step S114 the sampling frequency was not found changed, or after step S115 has been completed. In step S116, the setting control unit 163 unlocks the shared memory area 122. From step S116, control is returned to step S65 and passed on to step S66 in which OpenFinishedEvent is output to the audio data hook dll 103. The foregoing steps thus open the signal processing application program 104.

With the open process completed, the signal processing application program 104 causes the display control unit 162 to display, in a suitable notification area of Windows (R), an icon indicating to the user that the signal processing application program 104 has already been opened by an application program.

Figure 15:
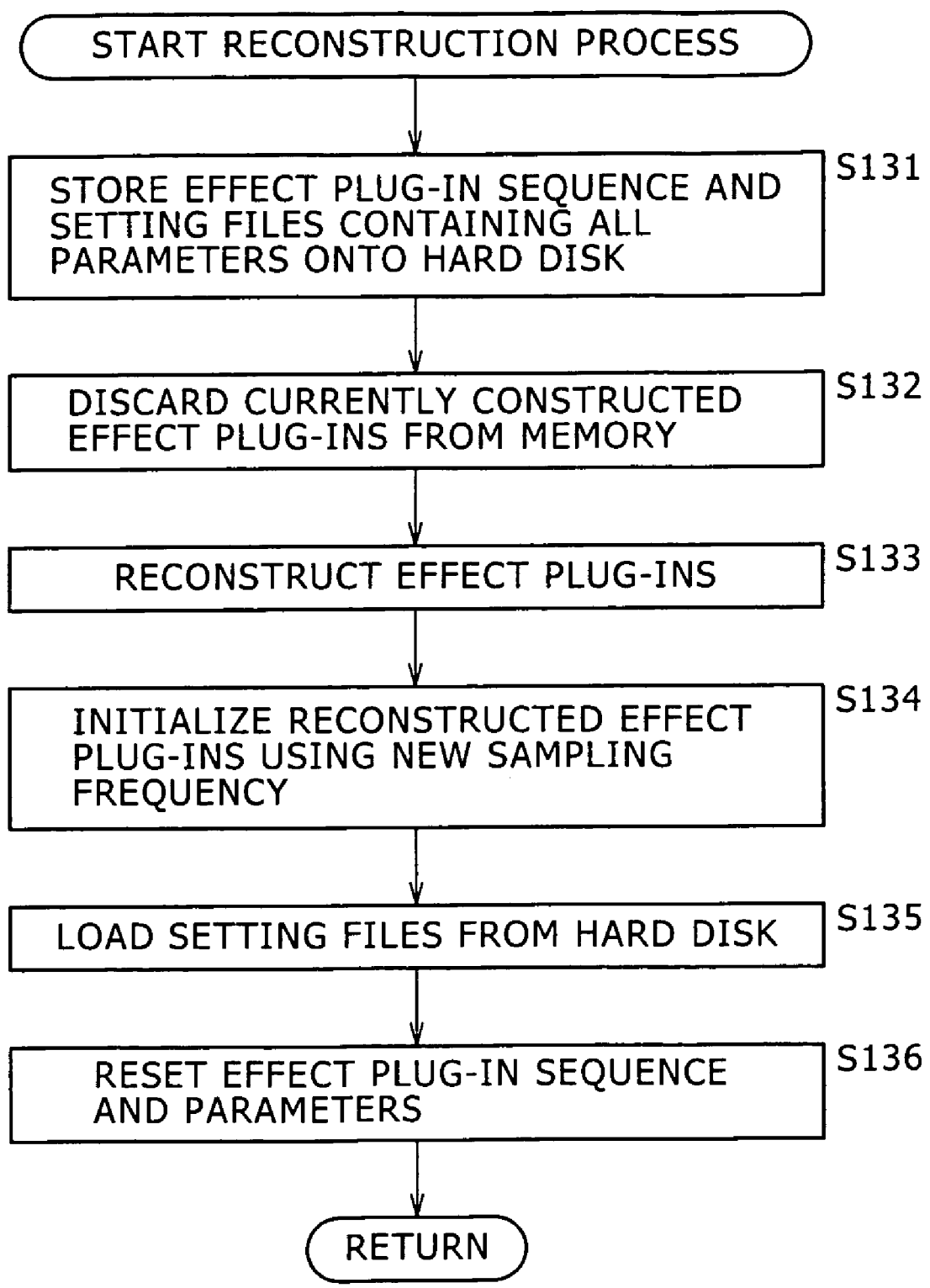
FIG. 15 is a flowchart of steps constituting a reconstruction process.

The reconstruction process of step S115 in FIG. 14 will now be described with reference to the flowchart of FIG. 15. The setting control unit 163 first notifies the effect setting unit 164 that the sampling frequency has been changed. In step S131, the effect setting unit 164 reads the sequence of the effect plug-ins 171-1 through 171-n (i.e., the order of effects to be given to the supplied audio data) from the effect processing unit 167 as well as the setting files containing all parameters, and causes the setting hold control unit 165 to store these items of information onto the HDD 38.

In step S132, the effect setting unit 164 discards from the RAM 36 the effect plug-ins 171-1 through 171-n currently constructed for the effect processing unit 167. The discarding involves two operations: the RAM 36 is deleted by overwriting the plug-in information therein, and the memory area allocated in the RAM 36 for processing by the effect processing unit 167 is rendered unallocated, the area being set not to be referenced for process execution (i.e., made available for overwriting in other processes).

In step S133, the effect setting unit 164 causes the effect processing unit 167 to reconstruct the effect plug-ins 171-1 through 171-n (i.e., to reallocate a processing area in the RAM 36 for the effect plug-ins based on the file paths of the internally stored effect plug-in entities, the area being set to be referenced for process execution).

In step S134, the effect setting unit 164 initializes the newly reconstructed effect plug-ins 171-1 through 171-n using the new sampling frequency.

In step S135, the effect setting unit 164 causes the setting hold control unit 165 to load the setting files from the HDD 38.

In step S136, the effect setting unit 164 resets the sequence of the effect plug-ins 171-1 through 171-n as well as the parameters involved in the effect processing unit 167. From step S136, control is returned to step S115 and passed on to step S116.

The steps above help to avert cases in which some of the effect plug-ins 171-1 through 171-n develop problems if the sampling frequency is changed halfway through processing. The foregoing steps also allow the existing effect plug-ins prepared for editing applications to be used unmodified for giving effects to the audio data being reproduced.

In the above example, the setting information prior to the reconstruction was shown stored on the HDD 38. Alternatively, the setting information may be stored in a device such as the RAM 36 rather than on the HDD 38.

In the example above, the settings of the effect plug-ins 171-1 through 171-n were shown reconstructed when the sampling frequency was changed. However, if the newly established sampling frequency is a frequency not supported by the effect plug-ins 171-1 through 171-n, then signal processing by the signal processing application program 104 will not take place. Instead, the next process is carried out (i.e., reading of the waveoutOpen function of Winmm.dll 102). In the ensuing write and close processes, various events are not reported to the signal processing application program 104; relevant functions of Winmm.dll 102 are called up and the audio data is output in the same manner as in related-art setups.

The effect plug-ins such as DirectX and VST are designed mainly for use by audio editing applications, so that some of them support only limited, frequently used sampling frequencies (e.g., 44.1 kHz, 48 kHz, and 96 kHz). That means some of the plug-ins will malfunction at a frequency that is not one of those supported. In the event of a request for reproduction at a sampling frequency not supported by the effect plug-ins, the signal processing by the signal processing application program 104 will not take place and the next process is carried out (i.e., reading of the waveoutOpen function of Winmm.dll 102). Thus in the ensuing write and close processes, various events are not reported to the signal processing application program 104, relevant functions of Winmm.dll 102 are called up, and the audio data is output in the same manner as in related-art setups.

As described, even if audio data reproduction is carried out by the typical application program 101 at a sampling frequency not supported by the effect plug-ins 171-1 through 171-n, the audio data can be output without error. The user is able to know whether the currently output audio data is being processed by the signal processing application program 104, by verifying, in a suitable notification area of Windows (R), the presence or absence of an icon indicating that the signal processing application program 104 is being used.

Figure 16:
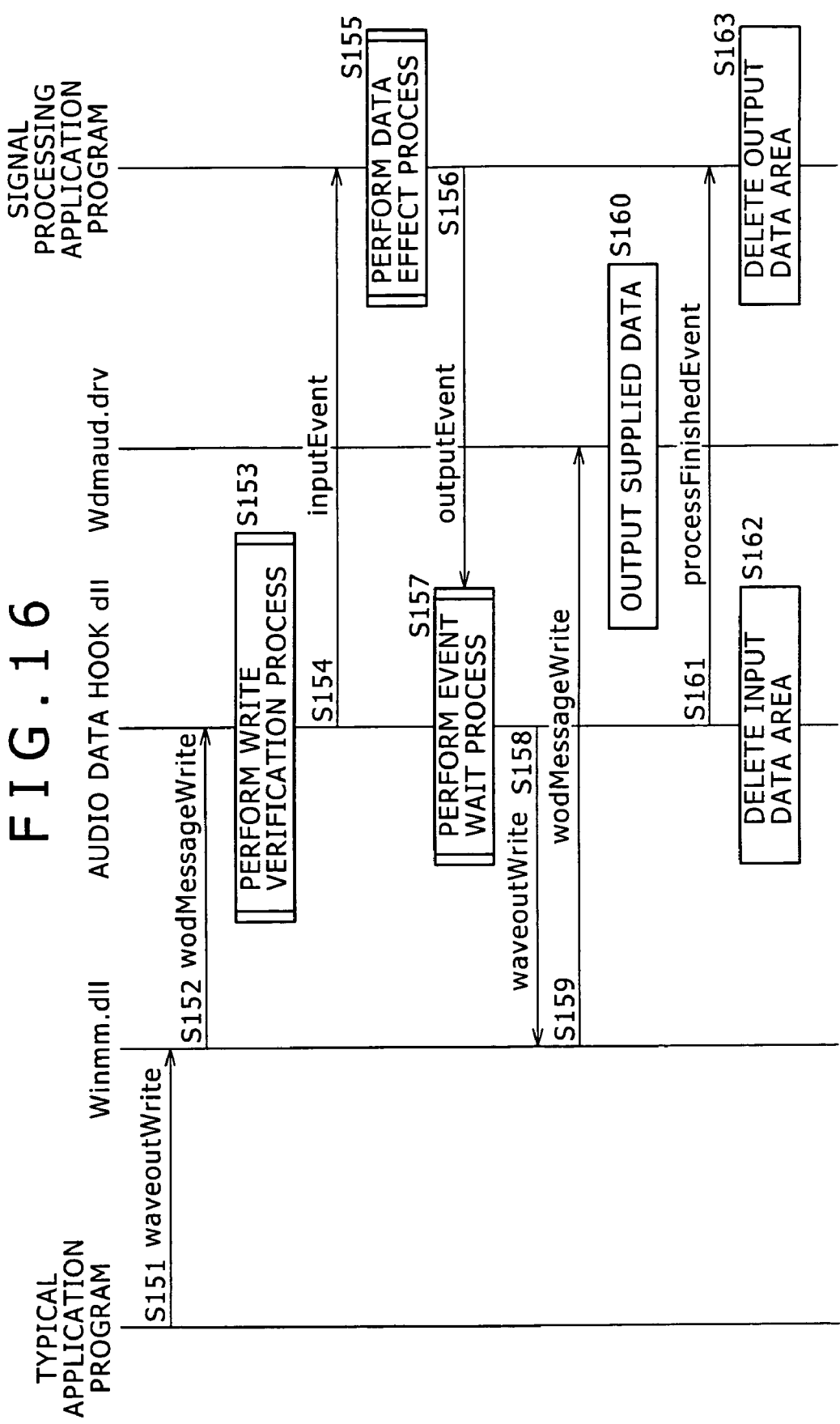
FIG. 16 is an arrow chart showing details of a write process.

The write process will now be described in detail with reference to the arrow chart of FIG. 16. In step S151, the typical application program 101 calls up the waveoutWrite function of Winmm.dll 102 in order to write audio data to the audio data hook dll 103 set as the default user mode driver (equivalent to the processing of step S37 in FIG. 11).

In step S152, Winmm.dll 102 calls up the wodMessage-Write function of the audio data hook dll 103 designated as the user mode driver (equivalent to the processing of step S38 in FIG. 11).

In step S153, the audio data hook dll 103 performs a write verification process, to be discussed later with reference to FIG. 17. In step S154, the audio data hook dll 103 outputs InputEvent to the signal processing application program 104 (equivalent to the processing of step S39 in FIG. 11).

In step S155, the signal processing application program 104 carries out a data effect process, to be described later with reference to FIG. 18 (equivalent to the processing of step S40 in FIG. 11).

In step S156, the signal processing application program 104 outputs OutputEvent to the audio data hook dll 103 (equivalent to the processing of step S41 in FIG. 11).

In step S157, the audio data hook dll 103 performs an event wait process, to be discussed later with reference to FIG. 19.

In step S158, the audio data hook dll 103 calls up the waveoutWrite function of Winmm.dll 102 in order to output the audio data coming from the signal processing application program 104 to Wdmaud.drv 105 designated as the output destination driver by the signal processing application program 104. The audio data is thus fed to Winmm.dll 102 (equivalent to the processing of step S42 in FIG. 11).

In step S159, Winmm.dll 102 calls up the wodMessage-Write function of Wdmaud.drv 105 designated as the output destination driver by the signal processing application program 104, and sends the audio data to Wdmaud.drv 105 (equivalent to the processing of step S43 in FIG. 11).

In step S160, Wdmaud.drv 105 outputs the supplied audio data to the WDM audio driver 106. The driver 106 in turn causes the audio hardware 107 to output the audio data through the speakers 54. Steps S151 through S160 are repeated until the processing of the current series of audio data is finished.

In step S161, the audio data hook dll 103 outputs ProcessFinishedEvent to the signal processing application program 104. In step S162, the audio data hook dll 103 deletes an input data area (created in step S187 of FIG. 17, to be described later).

In step S163, the signal processing application program 104 deletes an output data area (created in step S212 of FIG. 18, to be discussed later). This completes the write process.

The write verification process performed by the audio data hook dll 103 in step S153 of FIG. 16 will now be described in more detail with reference to the flowchart of FIG. 17. In step S181, the setting control unit 141 checks the opened flag of its own to determine whether the signal processing application program 104 is already opened with the same handle as that of this write request. If in step S181 the signal processing application program 104 is not found already opened with the same handle, then control is passed on to step S191, to be described later.

If in step S181 the signal processing application program 104 is found already opened with the same handle, step S182 is reached. In step S182, the setting control unit 141 checks to see if the format area 151 exists in the shared memory area 122. That is, the setting control unit 141 determines whether the signal processing unit 123 is functioning (i.e., whether the signal processing application program 104 is normally active). If in step S182 the format area 151 is not found to exist in the shared memory area 122, control is transferred to step S191 to be discussed later.

If in step S182 the format area 151 is found to exist in the shared memory area 122, step S183 is reached. In step S183, the setting control unit 141 locks the format area 151 to protect the area against attempts at update by any other unit but by itself (i.e., against updating by the signal processing unit 123).

In step S184, the setting control unit 141 writes the input format of the audio data to the format area 151.

In step S185, the setting control unit 141 unlocks the format area 151.

In step S186, the fixed-float conversion processing unit 144 under control of the setting control unit 141 locks the data area 152 to protect the area against attempts at update by any other unit but by itself (i.e., against updating by the signal processing unit 123).

In step S187, the fixed-float conversion processing unit 144 creates in the data area 152 an input data area to which to write the data to be supplied to the signal processing unit 123.

In step S188, the output control unit 143 supplies the fixed-float conversion processing unit 144 with the audio data coming from the data acquisition unit 142, the data being destined for the signal processing unit 123. The fixed-float conversion processing unit 144 converts the supplied audio data from integer format to floating-point format.

In step S189, the fixed-float conversion processing unit 144 writes the floating-point format audio data to the input data area created in step S187.

In step S190, the fixed-float conversion processing unit 144 unlocks the data area 152. Control is returned to step S153 and passed on to step S154 in FIG. 16. In step S154, InputEvent is output to the signal processing application program 104.

If in step S181 the signal processing application program 104 is not found already opened with the same handle, or if in step S182 the format area 151 is not found to exist in the shared memory area 122, then step S191 is reached. In step S191, the setting control unit 141 calls up the waveoutOpen function of Winmm.dll 102 in order to output the audio data in the related-art manner instead of getting the signal processing application program 104 to process the audio data corresponding to this write request. In the ensuing close process, various events are not reported to the signal processing application program 104. Relevant functions of Winmm.dll 102 are called up, the audio data is output in the same manner as in related-art setups, and the process is terminated (control is not returned to step S153).

As described above, the audio data hook dll 103 determines whether the signal processing application program 104 is ready to process the audio data corresponding to the current write request. If the signal processing application program 104 is found ready to process the data, then the audio data hook dll 103 creates an input data area, writes the audio data converted into floating-point format to the input data area thus created, and outputs InputEvent to the signal processing application program 104.

Where a plurality of typical application programs 101 reproduce audio data, one of the programs 101 that initially opened the audio data hook dll 103 as the user mode driver is allowed to have the program's own audio data treated for effects continuously by the signal processing application program 104 until the program 101 in question performs the close process; no other application programs 101 are allowed to have their audio data processed for effects by the signal processing application program 104 until the close process is carried out by the initial program. That is, although a plurality of audio reproduction commands can be accepted, the typical application program 101 that first opened the audio data hook dll 103 is not adversely affected by the commands in getting its own audio data effect-treated and output. Only after the application program 101 that first opened the audio data hook dll 103 has completed the processing of its own audio data or while the processing is being suspended, can the audio data output by some other application program 101 be treated for effects by the signal processing application program 104.

Figure 18:
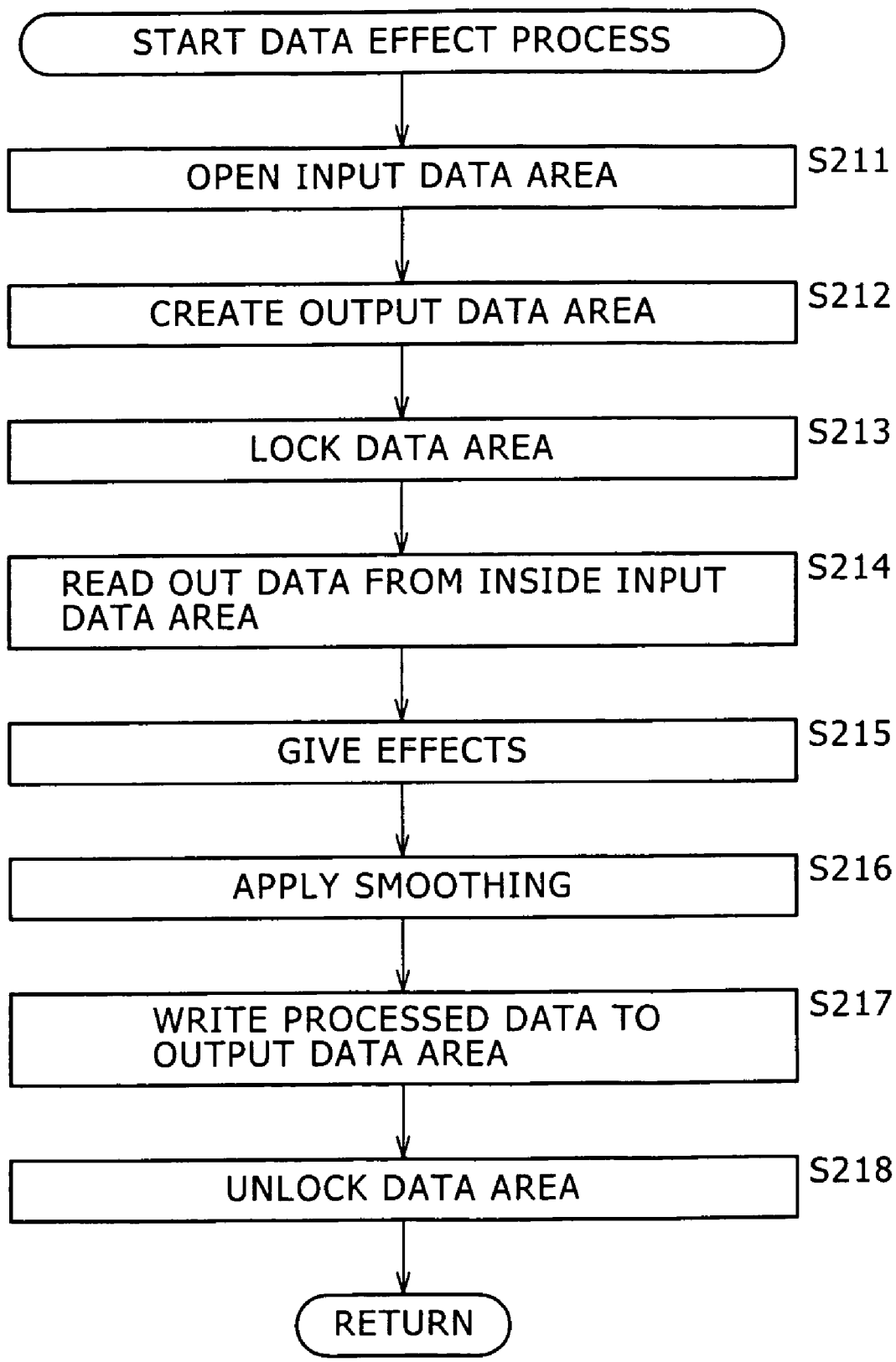
FIG. 18 is a flowchart of steps constituting a data effect process.

Described below with reference to the flowchart of FIG. 18 is the data effect process carried out by the signal processing application program 104 in step S155 of FIG. 16. In step S211, the data acquisition unit 166 in the signal processing unit 123 opens the input data area in the data area 152 of the shared memory area 122.

In step S212, the data output control unit 169 creates, in the data area 152 within the shared memory area 122, an output data area to which to write the audio data processed for effects.

In step S213, the data acquisition unit 166 or data output control unit 169 locks the data area 152 to protect the area against attempts at update by any other unit but by itself (i.e., against updating by the audio data hook processing unit 121).

In step S214, the data acquisition unit 166 reads the audio data from inside the input data area of the data area 152, and sends the retrieved data to the effect processing unit 167.

In step S215, the effect processing unit 167 gives effects to the supplied audio data based on the settings provided by the effect setting unit 164. The audio data treated for effects is forwarded to the smoothing processing unit 168.

In step S216, the smoothing processing unit 168 smoothes out the received effect-treated audio data in the manner described above with reference to FIG. 10. The audio data thus smoothed out is sent to the data output control unit 169.

In step S217, the data output control unit 169 writes the effect-treated audio data to that output area in the data area 152 which was created in step S212.

In step S218, the data acquisition unit 166 or data output control unit 169 unlocks the data area 152. From step S218, control is returned to step S155 and passed on to step S156. In step S156, OutputEvent is output to the audio data hook dll 103. The foregoing steps thus cause the effect plug-ins 171-1 through 171-n to process the supplied audio data.

Figure 19:
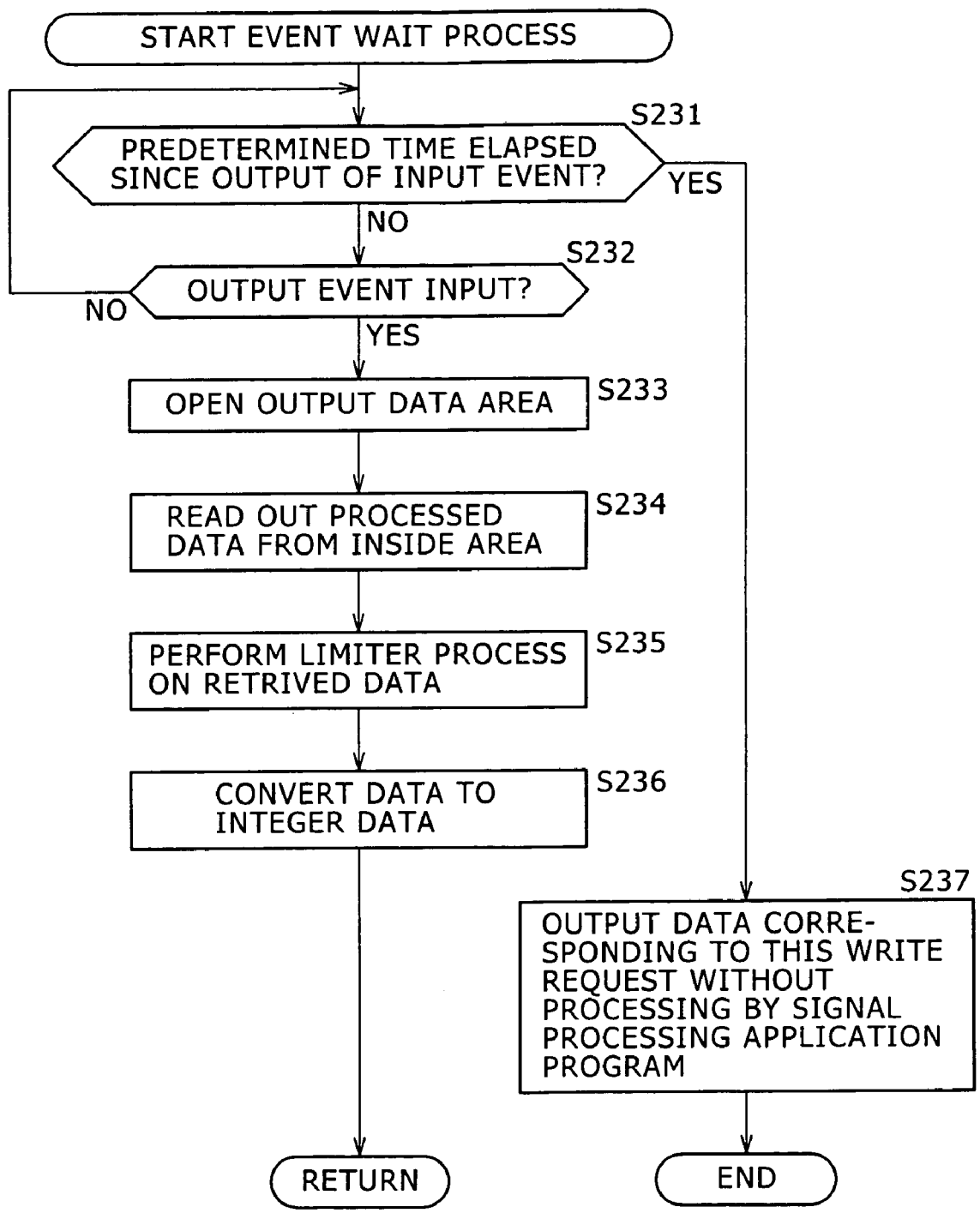
FIG. 19 is a flowchart of steps constituting an event wait process.

Described below with reference to the flowchart of FIG. 19 is the event wait process carried out by the audio data hook dll 103 in step S157 of FIG. 16. In step S231, the setting control unit 141 determines whether a predetermined time has elapsed since the output of InputEvent in step S154 of FIG. 16. If in step S231 the predetermined time is found to have elapsed, control is passed on to step S237, to be discussed later.

If in step S231 the predetermined time is not found to have elapsed since the output of InputEvent, step S232 is reached. In step S232, the setting control unit 141 determines whether OutputEvent is input from the signal processing application 104. If in step S232 OutputEvent is not found to have been input, step S231 is reached again and the subsequent steps are repeated.

If in step S232 OutputEvent is found to be input, step S233 is reached. In step S233, the limiter processing unit 145 opens the output data area in the data area 152 of the shared memory area 122.

In step S234, the limiter processing unit 145 reads out the effect-treated audio data from the output data area in the data area 152.

In step S235, the limiter processing unit 145 applies limits to the retrieved audio data and sends the limit-treated data to the float-fixed conversion processing unit 146.

In step S236, the float-fixed conversion processing unit 146 converts the supplied floating-point format audio data to integer data, and supplies the converted data to the output control unit 143. From step S236, control is returned to step S157 and passed on to step S158 in FIG. 16. In step S158, the waveoutWrite function of Winmm.dll 102 is read out, and the processed data is output.

If in step S231 the predetermined time is found to have elapsed since the output of InputEvent, i.e., if the signal processing application program 104 supposed to be executing the data effect process is found to have been terminated, then step S237 is reached. In step S237, the setting control unit 141 does not process the audio data corresponding to this write request by use of the signal processing application program 104. Instead, the setting control unit 141 in step S237 calls up the waveoutOpen function of Winmm.dll 102 in order to output the audio data in related-art fashion. The output control unit 143 is arranged to output the supplied audio data to Winmm.dll 102. In the ensuing close process, the setting control unit 141 does not report events to the signal processing application program 104; the setting control unit 141 calls up relevant functions of Winmm.dll 102 to output the audio data in the related-art manner, before terminating the processing (control is not returned to step S157).

Since the signal processing application program 104 and the audio data hook dll 103 that is the user mode driver are individually activated, the user might terminate the signal processing application program 104 halfway through signal processing. In that case, the process explained above with reference to FIG. 19 is carried out to let the audio data hook dll 103 change its audio data output destination in the absence of a response for a predetermined period of time from the signal processing application program 104 from which the arrival of OutputEvent is awaited. In this manner, with the signal processing application program 104 deactivated halfway, the audio data is allowed to flow uninterrupted so that audio data reproduction proceeds without error.

When the signal processing application program 104 is again activated, the audio data hook dll 103 starts the open process anew to know that the format area 151 exists. This allows the audio data hook dll 103 to find that the signal processing application program 104 is started again, thereby quickly resuming the signal processing by use of the effect plug-ins 171-1 through 171-n.

Figure 20:
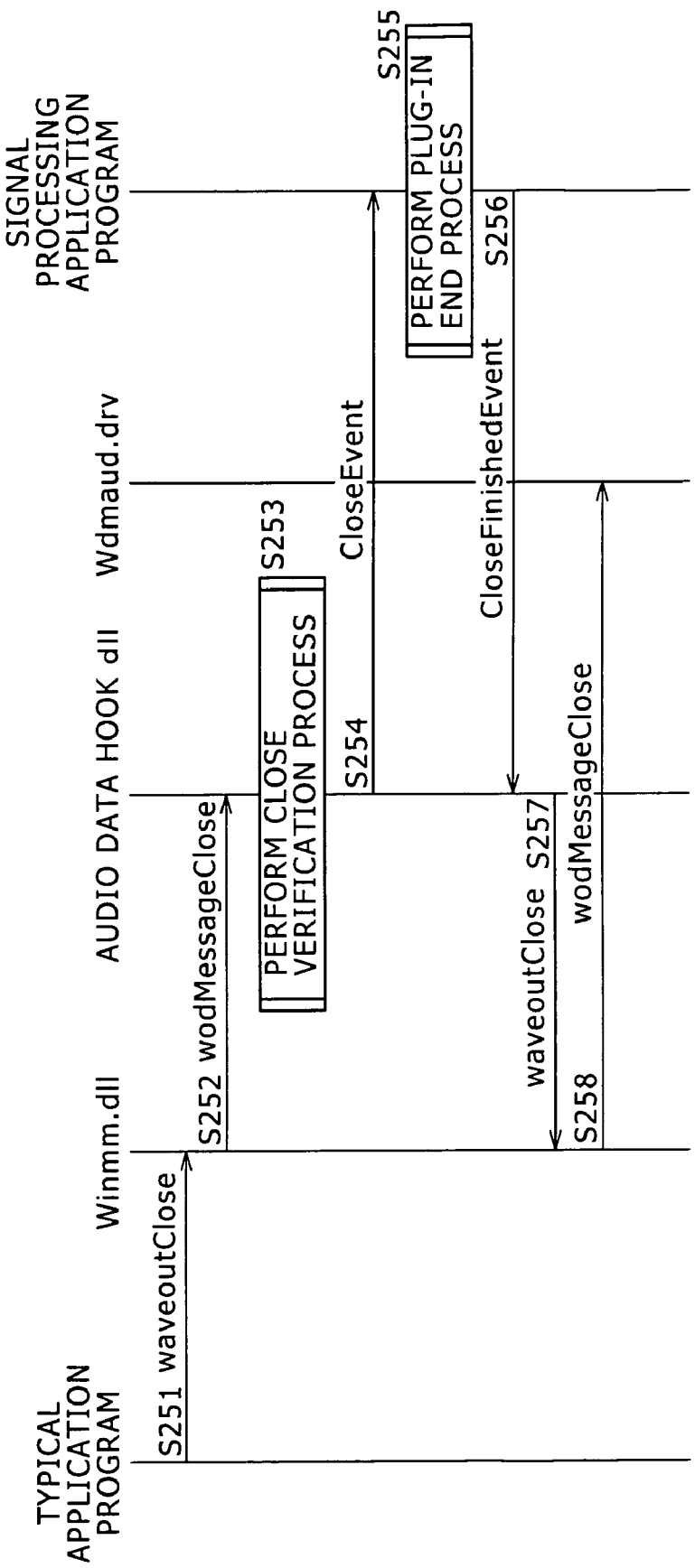
FIG. 20 is an arrow chart showing details of a close process.

The close process will now be described in detail with reference to the arrow chart of FIG. 20. In step S251, the typical application program 101 calls up the waveoutClose function of Winmm.dll 102 in order to report to the audio data hook dll 103, set as the default user mode driver, that writing of the audio data has ended (equivalent to the processing of step S44 in FIG. 11).

In step S252, Winmm.dll 102 calls up the wodMessageClose function of the audio data hook dll 103 designated as the user mode driver (equivalent to the processing of step S45 in FIG. 11).

In step S253, the audio data hook dll 103 carries out a close verification process, to be described later with reference to FIG. 21. In step S254, the audio data hook dll 103 outputs CloseEvent to the signal processing application program 104 (equivalent to the processing of step S46 in FIG. 11).

In step S255, the signal processing application program 104 terminates the plug-ins. In step S256, the signal processing application program 104 outputs CloseFinishedEvent to the audio data hook dll 103 (equivalent to the processing of step S47 in FIG. 11).

In step S257, the audio data hook dll 103 calls up the waveoutClose function of Winmm.dll 102 in order to report to Wdmaud.drv 105, designated as the output destination driver by the signal processing application program 104, that writing of the audio data has ended (equivalent to the processing of step S48 in FIG. 11).

In step S258, Winmm.dll 102 calls up wodMessageClose function of Wdmaud.drv 105 designated as the output destination driver by the signal processing application program 104 (equivalent to the processing of step S49 in FIG. 11). This completes the close process.

Figure 21:
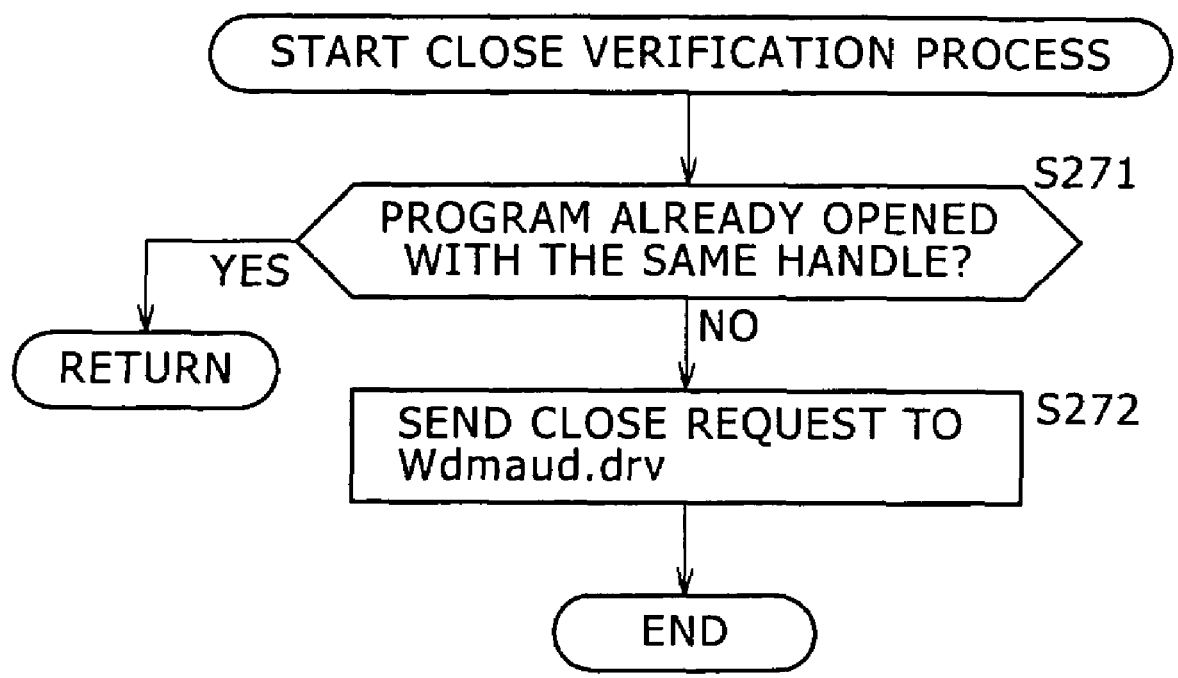
FIG. 21 is a flowchart of steps constituting a close verification process.

Described below with reference to the flowchart of FIG. 21 is the close verification process carried out by the audio data hook dll 103 in step S253 of FIG. 20.

In step S271, the setting control unit 141 in the data hook processing unit 121 checks an opened flag to determine whether the signal processing application program 104 is already opened with the same handle. If in step S271 the signal processing application program 104 is found already opened with the same handle, control is returned to step S253 and passed on to step S254 in FIG. 20. In step S254, CloseEvent is output to the signal processing application program 104.

If in step S271 the signal processing application program 104 is not found to be opened with the same handle, that means this close request does not correspond to the same handle as that of the data processed by the signal processing application program. In that case, step S272 is reached. In step S272, the setting control unit 141 in the data hook processing unit 121 sends a close request to Wdmaud.drv 105 via Winmm.dll 102 and terminates the processing (control is not returned to step S253).

When the handle is verified in the manner described above, the close request corresponding to the same handle as that of the data processed by the signal processing application program 104 is sent to that program 104. Any other close request is fed to Wdmaud.drv 105 via Winmm.dll 102.

When this invention is practiced as described above, the user can manipulate parameters of the effect plug-ins 171-1 through 171-n while audio data is not being reproduced, without having to be aware of the life time of the audio data hook dll 103 as the user mode driver. Because the internal status of the effect plug-ins 171-1 through 171-n can be retained, the user may proceed with signal processing using past operational results without being aware of the life time of the audio data hook dll 103.

The signal processing application program 104 is allowed directly to reference audio data. This makes it possible for the effect plug-ins 171-1 through 171-n to prepare GUI displays such as meters and spectrum analyzers indicative of the audio data being processed, as discussed above with reference to FIG. 9.

The typical application program 101 and the signal processing application program 104 operating in conjunction with the effect plug-ins 171-1 through 171-n are each an independent application program. That means the number of plug-in instances need not be increased to reflect a growing number of application programs 101. As a result, the activity ratio of the CPU 31 and the usage of the memory (RAM 36) can be reduced.

Where this invention is practiced, it is possible to avert cases in which some of the effect plug-ins 171-1 through 171-n develop problems if the sampling frequency is changed halfway through processing. The problems are bypassed when the setting information is temporarily stored, the effect plug-in configuration is reconstructed, and the signal processing program is reset using the new sampling frequency. Since there is no need to modify any effect plug-in program, the existing effect plug-ins designed for edit application programs may be used unmodified.

Although the above embodiment of the invention was shown getting the signal processing application program 104 to give effects to the audio data reproduced by the typical application program 101, this is not limitative of the invention. Alternatively, in addition to audio data reproduction, the invention can be applied to cases where the audio data to be recorded is fed to the signal processing application program 104 for effect processing, or where data as previously prepared files is supplied to the signal processing application program 104 for effect treatment.

The signal processing application program 104 is allowed to receive signal processing requests not only from the user mode driver such as the audio data hook dll 103 but also from other programs.

More specifically, the invention applies to a dll file or an application program which, taking over the audio data hook dll 103 as the user mode driver for audio data reproduction, reads an audio data file, supplies the file to the signal processing application program 104 for effect treatment, and outputs the effect-treated audio data as a file.

Although the above embodiment of this invention was shown getting the effect plug-ins to give effects to the supplied audio data and to output the effect-treated audio data, this is not limitative of the invention. Alternatively, the invention can be applied to the processing of something other audio data, such as image data. Furthermore, the invention is also applicable where audio data is used as a trigger to give such effects as reproducing a totally different sound or reproducing data other than audio data. For example, the invention applies where part or all of the effect plug-ins 171-1 through 171-n change images using the volume or frequency of a reproduced sound as the trigger, as in the case of "Visual Effects" by Windows Media Player (trademark).

Where this invention is practiced, as has been discussed extensively, it is possible to avert cases in which some of the effect plug-ins 171-1 through 171-n develop problems if the sampling frequency is changed halfway through processing. The troubles are circumvented by temporarily storing the setting information in effect, reconstructing the effect plug-in configuration, and resetting the signal processing program using the new sampling frequency. However, the scope of the invention is not limited to dealing with changed sampling frequencies for audio data plug-in effects. The invention also applies to modules which handle data other than audio data (e.g., image data) and which can develop problems if any of their parameters is changed halfway through processing. Illustratively, if image processing modules cannot have any of their parameters reset during execution, problems are circumvented by temporarily storing the setting information in effect, reconstructing the module configuration, and resetting the signal processing program using the newly established parameters.

As another alternative, the effect processing unit 167 in the signal processing unit 123 may contain therein effect processing modules replacing part or all of the effect plug-ins 171-1 through 171-n which are operable independently.

The series of steps or processes described above may be executed just as effectively by software. For the software-based processing to take place, the programs constituting the software may be either incorporated beforehand in dedicated hardware of a computer or installed upon use from a suitable program storage medium into a general-purpose personal computer or like equipment capable of executing diverse functions based on the installed programs.

As shown in FIG. 3, the program storage medium is offered to users apart from the computer typically as a package medium constituted by the magnetic disk 41 (including flexible disks), optical disk 42 (including CD-ROM (compact disk-read only memory) and DVD (digital versatile disc)), magneto-optical disk 43 (including MD (Mini-disc; trademark)), or semiconductor memory 44, each medium carrying the necessary programs thereon.

In this specification, the steps which are stored on the program storage medium and which describe the programs to be executed represent not only the processes that are to be carried out in the depicted sequence (i.e., on a time series basis) but also processes that may be performed parallelly or individually.

It is to be understood that while invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An information processing apparatus for acquiring data and executing signal processing on said data, said information processing apparatus comprising:
   data acquiring means for acquiring said data;
   information acquiring means for acquiring information necessary for executing said signal processing on said data;
   signal processing means for executing said signal processing on said data acquired by said data acquiring means by calling up at least one signal processing program;
   signal processing controlling means for controlling said signal processing means based on said information acquired by said information acquiring means; and
   setting information recording controlling means for controlling recording of setting information for said signal processing means, wherein
   when a parameter included in said information acquired by said information acquiring means is changed to a different value,
      setting information recording controlling means controls the recording of said setting information for said signal processing means,
      said signal processing controlling means discards execution settings of said at least one signal processing program called up by said signal processing means, and
      said signal processing controlling means again calls up said signal processing program for initialization using the parameter with the different value, reads out said setting information, the recording of which was controlled by said setting information recording controlling means, and resets said setting information for said signal processing program called up by said signal processing means.

2. An information processing apparatus according to claim 1, further comprising:
   data controlling means which, when said data is acquired, determines whether said signal processing is to be executed by said signal processing means on said data so as to control an output destination for said data; and
   recording means for temporarily recording said data and said information so that said signal processing means and said data controlling means may exchange either said data or said information therebetween;
   wherein said data controlling means, upon determining that said signal processing is to be executed, records said data and said information to said recording means; and
   wherein said data acquiring means and said information acquiring means acquire said data and said information recorded by said recording means.

3. An information processing apparatus according to claim 1, wherein at least one of the signal processing programs to be called up by said signal processing means is constituted by an effect plug-in.

4. An information processing apparatus according to claim 3, wherein said effect plug-in applies predetermined effects to audio data, and said parameter is a sampling frequency.

5. An information processing method for use with an information processing apparatus for acquiring data and executing signal processing on said data, said information processing method comprising the steps of:
   acquiring information necessary for executing said signal processing on said data with an information acquiring device;
   determining whether a parameter included in said information acquired in said information acquiring step is changed;
   when said parameter is determined as changed to a different value in said determining step, controlling recording of setting information for said signal processing;
   discarding execution settings of a signal processing program called up to execute said signal processing;
   calling up again said signal processing program;
   initializing, using the parameter with the different value, said signal processing program called up in said program calling step;
   reading out said setting information of which the recording was controlled in said setting information recording controlling step; and
   resetting said signal processing program based on said setting information read out in said setting information reading step.

6. A computer-readable storage medium storing a program for causing a computer to execute signal processing on data, said program causing said computer to carry out a procedure comprising the steps of:
   acquiring information necessary for executing said signal processing on said data;
   determining whether a parameter included in said information acquired in said information acquiring step is changed;
   when said parameter is determined as changed to a different value in said determining step, controlling recording of setting information for said signal processing;
   discarding execution settings of a signal processing program called up to execute said signal processing;
   calling up again said signal processing program;
   initializing, using the parameter with the different value, said signal processing program called up in said program calling step;

reading out said setting information of which the recording was controlled in said setting information recording controlling step; and resetting said signal processing program based on said setting information read out in said setting information reading step.

7. An information processing apparatus for acquiring data and executing signal processing on said data, said information processing apparatus comprising:

a data acquiring device for acquiring said data;

an information acquiring device for acquiring information necessary for executing said signal processing on said data;

a signal processing device for executing said signal processing on said data acquired by said data acquiring device by calling up at least one signal processing program;

a signal processing controlling device for controlling said signal processing device based on said information acquired by said information acquiring device; and a setting information recording controlling device for controlling recording of setting information for said signal processing device, wherein, when a parameter included in said information acquired by said information acquiring device is changed to a different value, said setting information recording controlling device controls the recording of said setting information for said signal processing device, said signal processing controlling device discards execution settings of said at least one signal processing program called up by said signal processing device, and said signal processing controlling device again calls up said signal processing program for initialization using the parameter with the different value, reads out said setting information of which the recording was controlled by said setting information recording controlling device, and resets said setting information for said signal processing program called up by said signal processing device.

* * * * *